US012651148B2

(12) United States Patent
Cherubini et al.

(10) Patent No.: US 12,651,148 B2
(45) Date of Patent: Jun. 9, 2026

(54) NEURON CIRCUITS FOR SPIKING NEURAL NETWORKS

(71) Applicant: International Business Machines Corporation, Armonk, NY (US)

(72) Inventors: Giovanni Cherubini, Rueschlikon (CH); Marcel A. Kossel, Reichenburg (CH)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 17/664,432

(22) Filed: May 23, 2022

(65) Prior Publication Data

US 2023/0376736 A1     Nov. 23, 2023

(51) Int. Cl.
| | |
|---|---|
| *G06N 3/04* | (2023.01) |
| *G06F 7/503* | (2006.01) |
| *G06N 3/049* | (2023.01) |
| *G06N 3/08* | (2023.01) |
| *G06N 3/082* | (2023.01) |

(52) U.S. Cl.
CPC ............. *G06N 3/049* (2013.01); *G06F 7/503* (2013.01); *G06N 3/082* (2013.01)

(58) Field of Classification Search
CPC ............ G06N 3/049; G06N 3/04; G06N 3/06; G06N 3/063
See application file for complete search history.

(56) References Cited

U.S. PATENT DOCUMENTS

| | | | | |
|---|---|---|---|---|
| 4,885,757 A | * | 12/1989 | Provence | ................. G06N 3/09 708/801 |
| 6,374,385 B1 | * | 4/2002 | Hamalainen | .......... H03M 13/41 714/786 |
| 10,043,112 B2 | | 8/2018 | Talathi | |

(Continued)

FOREIGN PATENT DOCUMENTS

| | | |
|---|---|---|
| TW | 201824094 A | 7/2018 |
| TW | I851057 B | 8/2024 |
| WO | 2015175156 A1 | 11/2015 |

OTHER PUBLICATIONS

Oh et al., "Spiking Neural Networks With Time-to-First-Spike Coding Using TFT-Type Synaptic Device Model", Jun. 3, 2021, IEEE Access, pp. 78098-78107 (Year: 2021).*

(Continued)

*Primary Examiner* — Paulinho E Smith
(74) *Attorney, Agent, or Firm* — Stephen R. Yoder

(57)     ABSTRACT

Neuron circuits are provided for spiking neural network apparatus having multiple such neuron circuits interconnected by links, each associated with a respective weight, for transmission of signals between neuron circuits. A neuron circuit includes a digital transmitter for generating trigger signals, indicating a state of the neuron circuit, on outgoing links of the circuit. The state is encoded in a time interval defined by these trigger signals. The neuron circuit includes a digital receiver for detecting such trigger signals on incoming links of the circuit, and digital accumulator logic. In response to detecting a trigger signal on an incoming link, the digital accumulator logic is adapted to generate a weighted signal dependent on the time interval and to accumulate the weighted signals generated from trigger signals on the incoming links to determine the state of the neuron circuit.

24 Claims, 14 Drawing Sheets

(56) References Cited

U.S. PATENT DOCUMENTS

| | | | | |
|---|---|---|---|---|
| 11,657,257 | B2* | 5/2023 | Van Der Made | G06N 3/049 706/15 |
| 2013/0024409 | A1* | 1/2013 | Hunzinger | G06N 3/049 706/25 |
| 2014/0032460 | A1* | 1/2014 | Cruz-Albrecht | G06N 3/065 706/16 |
| 2015/0106306 | A1* | 4/2015 | Birdwell | G06N 3/0985 706/11 |
| 2016/0042271 | A1* | 2/2016 | Yoon | G06N 3/0499 706/25 |
| 2016/0210552 | A1* | 7/2016 | Kasabov | G06N 3/049 |
| 2017/0200079 | A1* | 7/2017 | Amir | G06N 3/0499 |
| 2018/0164866 | A1* | 6/2018 | Turakhia | G06N 3/02 |
| 2018/0373977 | A1* | 12/2018 | Carbon | G06N 3/048 |
| 2020/0019839 | A1* | 1/2020 | Boahen | G06N 3/0499 |
| 2021/0150317 | A1* | 5/2021 | Hou | G06N 3/08 |
| 2021/0294573 | A1* | 9/2021 | Morie | G06N 3/065 |
| 2023/0081715 | A1* | 3/2023 | Timofejevs | G06N 3/065 706/21 |
| 2023/0093115 | A1* | 3/2023 | Ben-Bassat | G06N 3/049 706/26 |
| 2023/0100670 | A1* | 3/2023 | Beidas | G06N 3/063 706/15 |
| 2023/0135011 | A1* | 5/2023 | Park | G06N 3/049 706/26 |
| 2023/0289582 | A1* | 9/2023 | Bae | G06N 3/065 |
| 2023/0376736 | A1* | 11/2023 | Cherubini | G06N 3/049 |
| 2024/0013046 | A1* | 1/2024 | Le | G06N 3/08 |

OTHER PUBLICATIONS

Neckar et al., "Braindrop: A Mixed-Signal Neuromorphic Architecture With a Dynamical Systems-Based", Jan. 2019, IEEE, vol. 17 No. 1, pp. 144-164 (Year: 2019).*

Kaulmann et al., "A Digital Framework for Pulse Coded Neural Network Hardware with Bit-Serial Operation", 2007, IEEE, pp. 302-307 (Year: 2007).*

Hafliger, "Adaptive WTA With an Analog VLSI Neuromorphic Learning Chip", Mar. 2007, IEEE Transactions on Neural Networks, vol. 18 No. 2, pp. 551-572 (Year: 2007).*

Galan et al., "An Event-Based Digital Time Difference Encoder Model Implementation for Neuromorphic Systems", May 2022, IEEE Transactions on Neural Networks and Learning Systems, vol. 33, No. 5, pp. 1959-1973 (Year: 2022).*

Benjamin et al., "Neurogrid: A Mixed-Analog-Digital Multichip System for Large-Scale Neural Simulations", Apr. 2014, IEEE, pp. 699-716 (Year: 2014).*

Oh et al., "Spiking Neural Networks with Time-to-First-Spike Coding Using TFT-Type Synaptic Device Model", IEEE Access, current version Jun. 3, 2021, DOI: 10.1109/ACCESS.2021. 3083056, 10 pages.

P et al., "You Only Spike Once: Improving Energy-Efficient Neuromorphic Inference to ANN-Level Accuracy", arXiv:2006. 09982v1 [cs.NE], Jun. 3, 2020, 10 pages.

Zhou et al., "Temporal-Coded Deep Spiking Neural Network with Easy Training and Robust Performance", arXiv:1909.10837v3 [cs. CV], Aug. 12, 2020, 10 pages.

International Search Report and Written Opinion, International Application No. PCT/IB2023/054175, International Filing Date Apr. 24, 2023, 15 pages.

Adam, Karen, "A Time Encoding Approach To Training Spiking Neural Networks", arXiv:2110.06735v1 [cs.NE] Oct. 13, 2021, 5 pages.

Comsa et al., "Temporal Coding In Spiking Neural Networks With Alpha Synaptic Function", Downloaded on May 27, 2020, <https:// ieeexplore.ieee.org/document/9053856>, 5 pages.

Guo et al., "Neural Coding in Spiking Neural Networks: A Comparative Study for Robust Neuromorphic Systems" Published: Mar. 4, 2021, doi: 10.3389/fnins.2021.638474, 21 pages.

Liang et al., "Temporal-Sequential Learning With a Brain-Inspired Spiking Neural Network and Its Application to Musical Memory", Published: Jul. 2, 2020, doi: 10.3389/fncom.2020.00051, 17 pages.

Mostafa, Hesham, "Supervised Learning Based on Temporal Coding in Spiking Neural Networks", vol. 29, No. 7, Jul. 2018, 9 pages.

Oh et al., "Hardware Implementation of Spiking Neural Networks Using Time-To-First-Spike Encoding", Published Date: Jun. 2020, 20 pages.

Ranhel et al., "Bistable Memory and Binary Counters in Spiking Neural Network", Downloaded on May 4, 2022, 8 pages.

Sim et al., "Comparative analysis of digital STDP learning circuits designed using counter and shift register", Downloaded on Aug. 15, 2021, 4 pages.

Vun et al., "Thermometer Code based Modular Arithmetic", © 2012 IEEE, 5 pages, <https://ieeexplore.ieee.org/stamp/stamp.jsp?tp= &arnumber=6342081>.

Yu et al., "A brain-inspired spiking neural network model with temporal encoding and learning", Accepted Jun. 27, 2013, 11 pages, <http://dx.doi.org/10.1016/j.neucom.2013.06.052>.

Wozniak et al., "Neuromorphic Spike Integrator Apparatus", U.S. Appl. No. 16/565,852, filed Sep. 10, 2019.

* cited by examiner

Spike Signaling

PWM Signaling

Spike Signaling

PWM Signaling

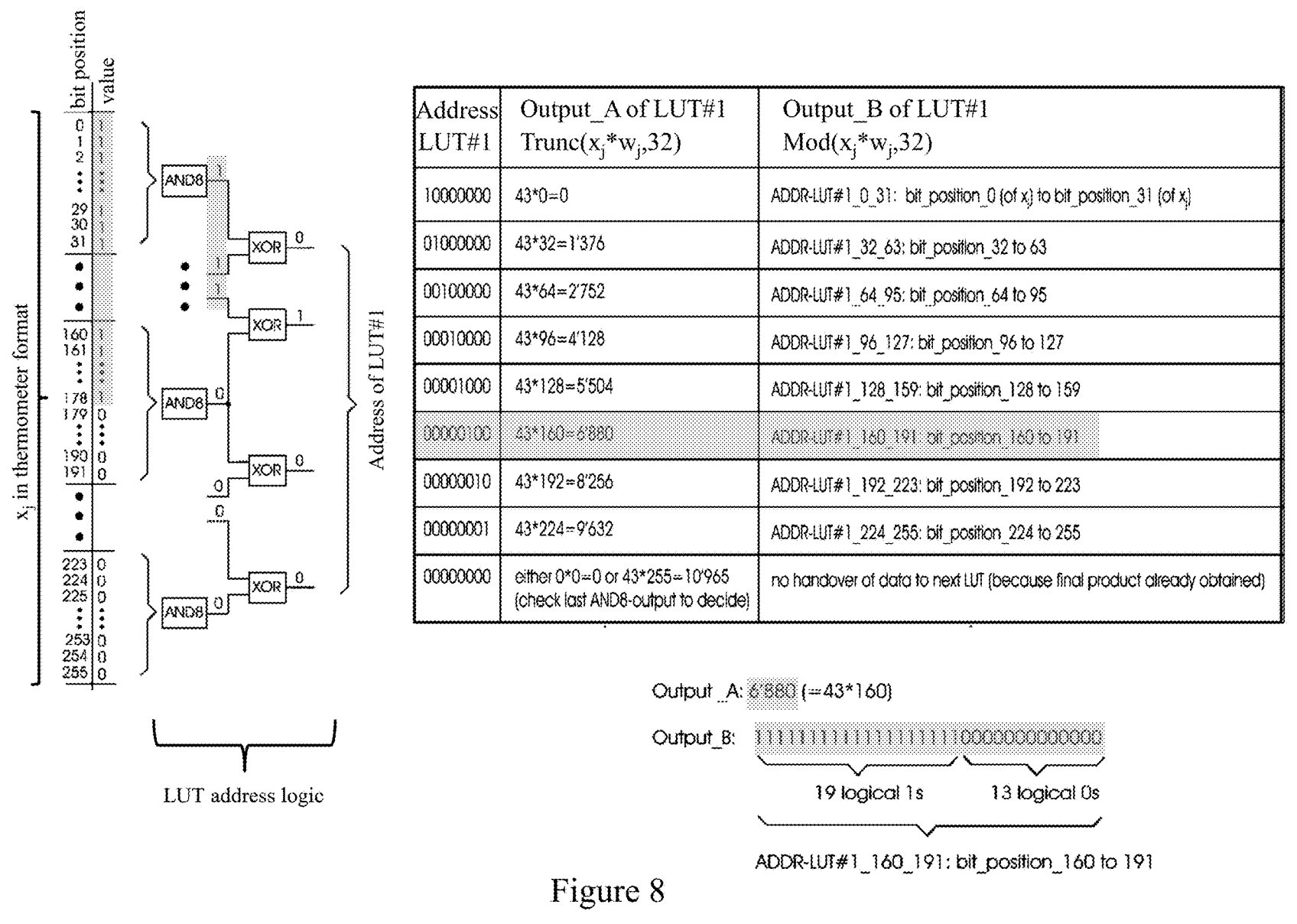

| Address LUT#1 | Output_A of LUT#1 $\mathrm{Trunc}(x_j*w_j,32)$ | Output_B of LUT#1 $\mathrm{Mod}(x_j*w_j,32)$ |
|---|---|---|
| 10000000 | 43*0=0 | ADDR-LUT#1_0_31: bit_position_0 (of x_j) to bit_position_31 (of x_j) |
| 01000000 | 43*32=1'376 | ADDR-LUT#1_32_63: bit_position_32 to 63 |
| 00100000 | 43*64=2'752 | ADDR-LUT#1_64_95: bit_position_64 to 95 |
| 00010000 | 43*96=4'128 | ADDR-LUT#1_96_127: bit_position_96 to 127 |
| 00001000 | 43*128=5'504 | ADDR-LUT#1_128_159: bit_position_128 to 159 |
| 00000100 | 43*160=6'880 | ADDR-LUT#1_160_191: bit_position_160 to 91 |
| 00000010 | 43*192=8'256 | ADDR-LUT#1_192_223: bit_position_192 to 223 |
| 00000001 | 43*224=9'632 | ADDR-LUT#1_224_255: bit_position_224 to 255 |
| 00000000 | either 0*0=0 or 43*255=10'965 (check last AND8-output to decide) | no handover of data to next LUT (because final product already obtained) |

Output_A: 6'880 (=43*160)

Output_B: 11111111111111111110000000000000

19 logical 1s    13 logical 0s

ADDR-LUT#1_160_191: bit_position_160 to 191

Address of LUT#1

LUT address logic

XOR   0
XOR   1
XOR   0
XOR   0

AND8

AND8

AND8 value bit position   0 1 2 ⋯ 29 30 31   •••   160 161 ⋯ 178 179 ⋯ 190 191   •••   223 224 225 ⋯ 253 254 255

$x_j$ in thermometer format

Figure 8

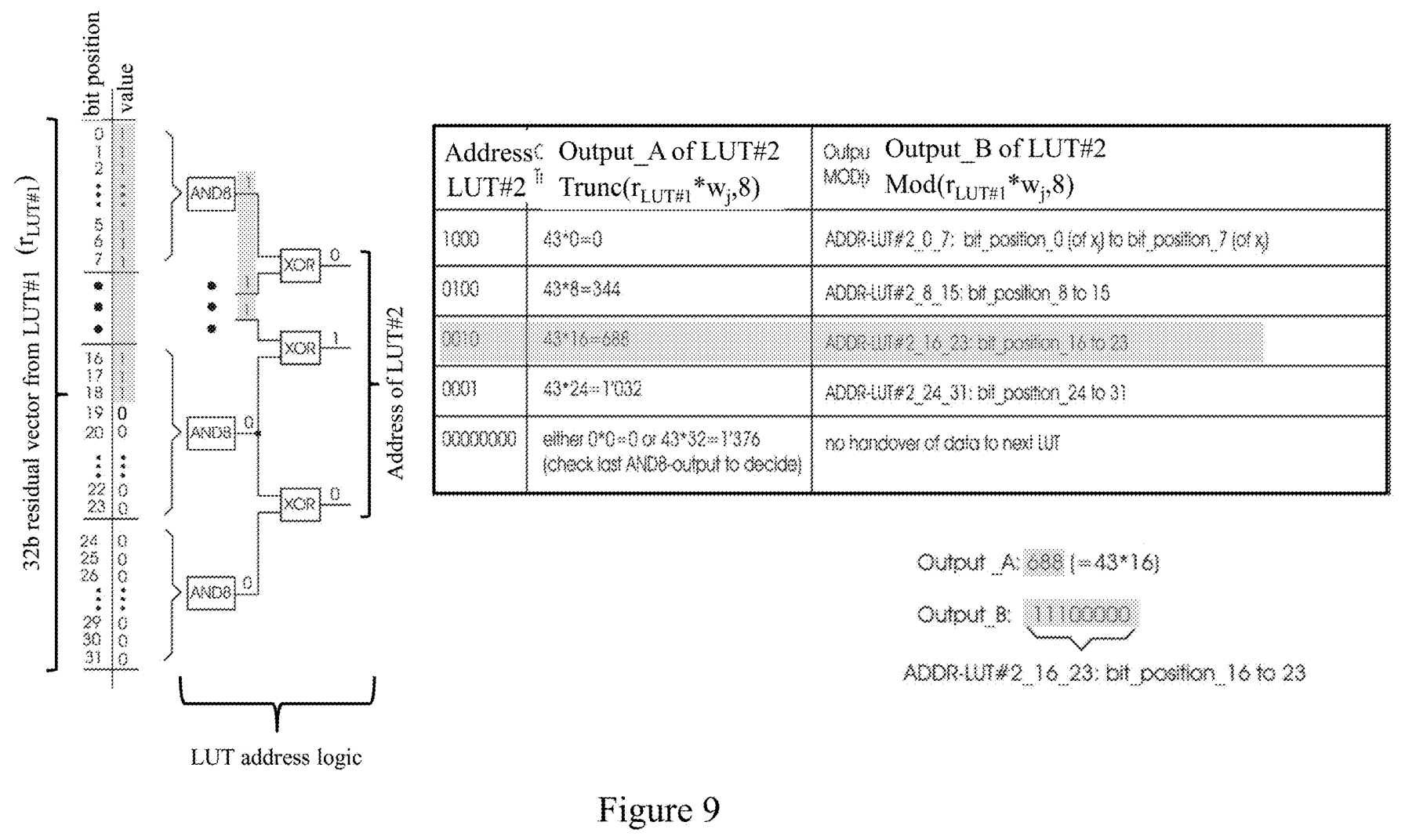

| Address of LUT#2 | Output_A of LUT#2 $= \text{Trunc}(r_{LUT\#1} * w_j, 8)$ | Output Output_B of LUT#2 $\text{MOD}$: $\text{Mod}(r_{LUT\#1} * w_j, 8)$ |
|---|---|---|
| 1000 | 43*0=0 | ADDR-LUT#2_0_7; bit_position_0 (of x) to bit_position_7 (of x) |
| 0100 | 43*8=344 | ADDR-LUT#2_8_15; bit_position_8 to 15 |
| 0010 | 43*16=688 | ADDR-LUT#2_16_23; bit_position_16 to 23 |
| 0001 | 43*24=1032 | ADDR-LUT#2_24_31; bit_position_24 to 31 |
| 00000000 | either 0*0=0 or 43*32=1376 (check last AND8-output to decide) | no handover of data to next LUT |

Output_A_16 (=43*16)

Output_B:

ADDR-LUT#2_16_23: bit_position_16 to 23

Figure 9

32b residual vector from LUT#1 ($r_{LUT\#1}$)

bit position value

AND8

XOR

Address of LUT#2

LUT address logic

| Address LUT#3 | Output_A of LUT#3 ($r_{LUT\#2}{}^{*}w_j$) |
|---|---|
| 10000000 | 43*1 = 43 |
| 11000000 | 43*2 = 86 |
| 11100000 | 43*3 = 129 |
| 11110000 | 43*4 = 172 |
| 11111000 | 43*5 = 215 |
| 11111100 | 43*6 = 258 |
| 11111110 | 43*7 = 301 |
| 11111111 00000000 | These states are already covered by previous LUTs |

Output_A: 129 (= 43*3)

NEURON CIRCUITS FOR SPIKING NEURAL NETWORKS

BACKGROUND

The present invention relates generally to neuron circuits for spiking neural networks. Digital neuron circuits are provided, together with spiking neural network apparatus employing such circuits.

Spiking neural networks (SNNs) represent an efficient class of artificial neural networks. In SNNs, a network of interconnected neurons communicates through sequences of spikes, thus closely resembling biological neural networks. The spike trains convey information on the state of individual neurons and are commonly interpreted as all-or-none signals, corresponding to binary communication with ones and zeros. Spikes (ones) are sparse and asynchronous, leading to highly efficient operation.

Neural encoding concerns how information is communicated via electrical signals (often called "action potentials") at the level of individual neurons in SNNs. The goal of neural encoding methods is to enable fast and reliable processing of neural information. Rate coding, where the information is encoded in the spiking rate of neurons, has been a dominant paradigm for many years. However, reliable estimation of neural firing rates requires the transmission of large numbers of spikes and introduces significant latency. Considerably faster processing of information can be achieved by time encoding methods, where neural communication is based on the precise timing of action potentials.

Neuron circuits for efficient implementation of time encoded SNNs would be highly desirable.

SUMMARY

A first aspect of the present invention provides a neuron circuit for use in spiking neural network apparatus having multiple such neuron circuits interconnected by links, each associated with a respective weight, for transmission of signals between neuron circuits. The neuron circuit includes a digital transmitter for generating trigger signals, indicating a state of the neuron circuit, on outgoing links of the circuit. The state is encoded in a time interval defined by these trigger signals. The neuron circuit further comprises a digital receiver having a signal detector for detecting such trigger signals on incoming links of the circuit, and digital accumulator logic. In response to detection of a trigger signal on an incoming link, the digital accumulator logic is adapted to generate a weighted signal dependent on the time interval defined by that trigger signal and the weight associated with that incoming link, and to accumulate the weighted signals generated from trigger signals on the incoming links to determine the state of the neuron circuit.

Embodiments of this invention provide digital neuron circuits for efficient, fully digital implementations of time-encoded SNNs. As explained in detail below, embodiments can readily implement Time-to-Spike (TTS) or Time-to-First-Spike (TTFS) encoding techniques, and particularly advantageous embodiments offer selective operation in both of these encoding modes.

To implement TTS encoding, the digital accumulator logic can be adapted to accumulate the weighted signals periodically, with period T, to determine the state of the neuron circuit at the end of each period T. The transmitter then generates a trigger signal indicating that state during the next period T. The transmitter may be adapted such that the trigger signal defines the time interval with reference to the end of the next period T. This offers an implementation with minimum-latency. Alternatively, the transmitter may be adapted such that the trigger signal defines the time interval with reference to the start of the next period T. This offers a robust implementation in which no skew calibration of links is required.

The digital accumulator logic of TTS encoding embodiments can be conveniently implemented by counter logic. The counter logic is adapted, for each incoming link, to generate a thermometer-encoded output value dependent on the time interval defined by a trigger signal on that link, and graphical multiplication logic adapted, for each incoming link, to multiply the thermometer-encoded output value by the weight associated with that link to obtain components of the weighted signal for that link. The accumulator logic further comprises summation logic which is adapted to sum the aforementioned components to generate the weighted signal for each incoming link, and to sum the weighted signals generated during each period T to produce an accumulated signal indicating the neuron state. No ADC (Analog-to-Digital Converter) is required in the receiver here because trigger signals are processed purely in the digital domain by a graphical multiplication approach. The summation logic can be implemented highly efficiently using carry-save and ripple-carry adders.

To implement TTFS encoding, the digital accumulator logic can be adapted to accumulate the weighted signals during each of successive time periods T' to produce an accumulated signal, and to progressively compare the accumulated signal with a threshold to determine the state of the neuron circuit during that period T'. The transmitter then generates a trigger signal during that period T' in response to the accumulated signal traversing the threshold. In some embodiments here, the digital accumulator logic comprises, for each incoming link, a digital integrator which is adapted, in response to detection of a trigger signal on that link, to start integrating a value dependent on the weight associated with that link to generate the weighted signal for that link, and summation logic adapted to sum the weighted signals generated during each period T' to produce the accumulated signal. Again, trigger signals are processed entirely in the digital domain so no ADC is required in the receiver. These embodiments also offer low-complexity, low-area implementations in which weights can be stored in simple registers. The digital integrator can be implemented in a simple manner by concatenated counters, with efficient implementation of the summation logic using carry-save and ripple-carry adders.

Advantageously in TTFS embodiments, the digital accumulator logic comprises weighting logic adapted to generate the weighted signal for each incoming link by outputting a weight value, dependent on the weight associated with that link, in response to detection of a trigger signal on that link, and a digital integrator adapted to integrate weight values output by the weighting logic for incoming links during the time period T' to produce the accumulated signal. This offers particularly simple, low-area implementations with a global integrator for all incoming links. Moreover, a simple and efficient global integrator can be implemented using carry-save and ripple-carry adders.

In particularly advantageous embodiments, the digital accumulator logic is adapted to accumulate the weighted signals to produce an accumulated signal during each of successive time periods T', and the neuron circuit is selectively operable in first and second modes. In the first mode, the digital accumulator logic is adapted, during each period T', to progressively compare the accumulated signal with a threshold to determine the state of the neuron circuit during that period T', and the transmitter is adapted to generate a trigger signal during that period T' in response to the accumulated signal traversing the threshold. In the second mode, the digital accumulator logic is adapted to determine the state of the neuron circuit in dependence on the accumulated signal at the end of each period T', and the transmitter is adapted to generate a trigger signal indicating that state during the next period T'. These embodiments are thus selectively operable in both TTS and TTFS encoding modes. Moreover, the digital accumulator logic can be efficiently implemented using digital integrators as described above.

The transmitter of neuron circuits embodying the invention may be operable, for each outgoing link, to encode the weight associated with that link in a pulse signal embedded in trigger signals generated on that link. The receiver is then operable to decode the pulse signal embedded in a trigger signal on an incoming link to obtain the weight associated with that link. Various other features and advantages of neuron circuits embodying the invention will be described in relation to exemplary embodiments below.

Further aspects of the invention provide SNN apparatus comprising multiple neuron circuits according to embodiments described above, the neuron circuits being interconnected by links, each associated with a respective weight, for transmission of signals between the neuron circuits.

Embodiments of the invention will be described in more detail below, by way of illustrative and non-limiting example, with reference to the accompanying drawings.

BRIEF DESCRIPTION OF THE DRAWINGS

Preferred embodiments of the present invention will now be described, by way of example only, with reference to the following drawings, in which:

FIGS. 8 through 10 illustrate operation of the FIG. 7 receiver in response to an exemplary trigger signal on an incoming link;

DETAILED DESCRIPTION

Figure 1:
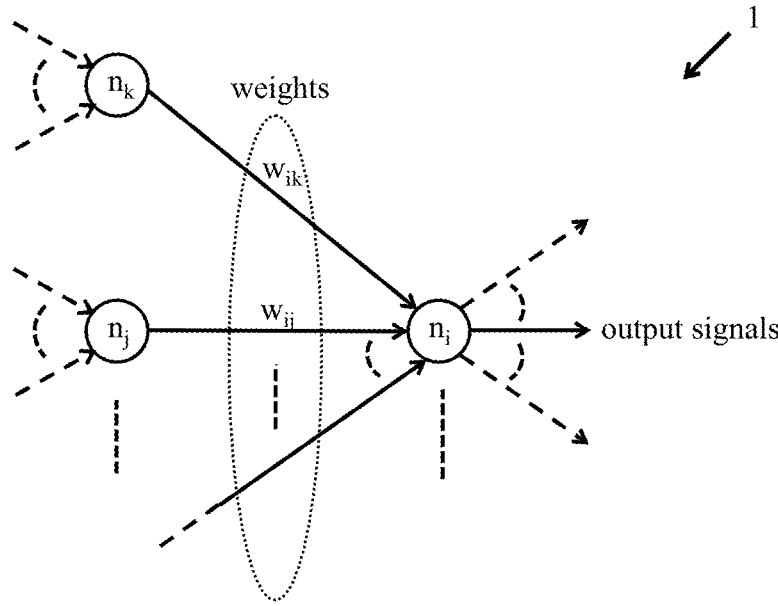
FIG. 1 illustrates basic structure of SNN apparatus embodying the invention.

The FIG. 1 schematic shows basic structure of SNN apparatus embodying the invention. The SNN 1 comprises a network of neuron circuits (represented by circles) which are interconnected by links (represented by arrows) for transmission of signals between the neuron circuits. Three neuron circuits ("neurons") are labeled $n_i$, $n_j$ and $n_k$ in this simple illustration, though a typical SNN will contain multiple neurons (often large numbers such as hundreds or thousands) which can be arranged and interconnected in various ways for communication of signals in the SNN. Neurons may, for example, be arranged in a series of layers, with each neuron in one layer being connected to (some or all) neurons in the next, whereby signals can be relayed across multiple neuron layers from an input to an output neuron layer. In other SNNs, neurons may be arranged in one or more assemblies in which neurons can be interconnected in various ways for communication of signals within and between neuron assemblies. Numerous other SNN architectures are known, and neuron circuits to be described can be applied to advantage in any SNN architecture.

Each link between a pair of neurons is associated with a respective weight which emulates the synaptic weight associated with synapses in biological neural networks. Hence, in FIG. 1, the incoming link of neuron $n_i$ from neuron $n_k$ has a weight denoted by $w_{ik}$; the incoming link from neuron $n_j$ has a corresponding weight $w_{ij}$; and so on throughout the network. In operation of SNN 1, a neuron receives signals from other neurons on its incoming links, and these signals are weighted by the corresponding link-weights and processed to update the state (often called "membrane potential") of the receiving neuron. The receiving neuron then generates output signals in dependence on its neural state, and these signals are transmitted on to other neurons via its outgoing links.

Figure 2:
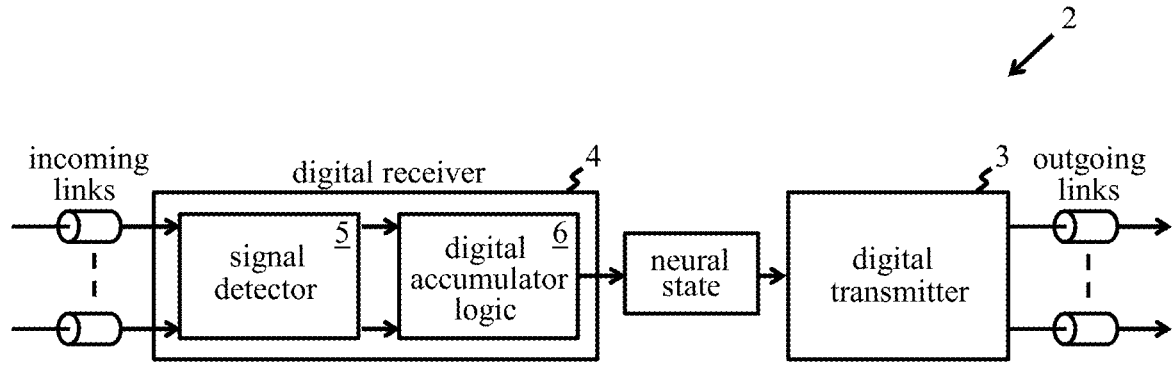
FIG. 2 is a schematic representation of a neuron circuit embodying the invention.

FIG. 2 shows components of a neuron circuit embodying the invention for use in SNN 1. The neuron 2 comprise a digital transmitter 3 for generating output signals ("trigger signals") on outgoing links of the circuit. These trigger signals indicate the aforementioned state of the neuron circuit. In particular, the transmitter 3 is adapted such that this neural state is encoded in a time interval defined by the trigger signals it generates. The neuron 2 further comprises a digital receiver 4 for receiving trigger signals from other neurons on incoming links of the circuit. The receiver 4 comprises a signal detector 5 for detecting trigger signals on the incoming links, and digital accumulator logic 6. This digital accumulator logic is adapted to generate, in response to detection of a trigger signal on an incoming link, a weighted signal which is dependent on the time interval defined by that trigger signal and the weight associated with that incoming link. The accumulator logic 6 then accumulates the weighted signals generated from trigger signals on the incoming links to determine the state of the neuron circuit. The neural state is supplied to digital transmitter 3 for generation of trigger signals as described above.

Figure 3:
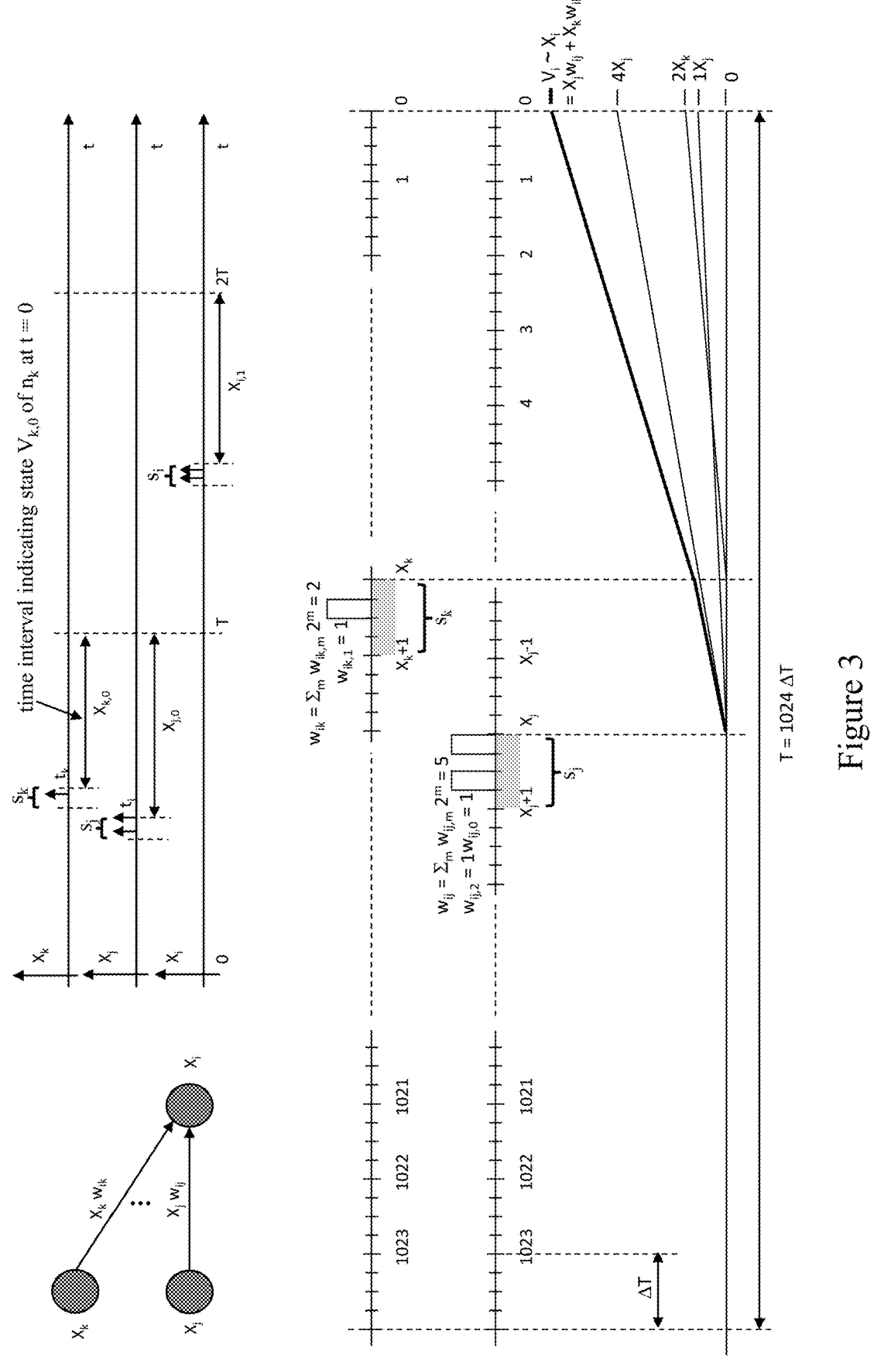
FIG. 3 illustrates operation of a TTS encoding scheme implemented by an embodiment of the neuron circuit.

FIG. 3 illustrates a TTS encoding scheme implemented by a first embodiment of neuron circuit 2. In TTS encoding, the membrane potential $V_i$ of a neuron $n_i$, receiving trains of spikes at times $t_p$, is given by Formula 1 reproduced below:

$$\frac{dV_i(t)}{dt} = \sum_p w_{ip} H(t - t_p), \; 0 \le t < T, \qquad \text{Formula 1}$$

where $w_{ip}$ are the synaptic weights for incoming links and H(t) is the Heaviside function. The membrane potential V of each neuron $n_i$, $n_j$ and $n_k$ shown in the upper left corner of FIG. 3 determines a corresponding time interval, denoted by $X_i$, $X_j$ and $X_k$ respectively, associated with output spike signals generated by the neuron in each of successive time periods T, where T denotes the (non-leaky) integration time to complete one iteration of neuron operation. Thus, as shown in the upper timeline in the figure, neuron $n_k$ generates a spike signal at time $t_k$ such that the time interval $X_{k,0}$ indicates the value of the membrane potential $V_{k,0}$ of $n_k$ at time t=0. Similarly, the time interval $X_{j,0}$ indicates the value of the membrane potential $V_{j,0}$ of neuron $n_j$ at time t=0. In embodiments described below, if the values of synaptic weights $w_{ik}$ and $w_{ij}$ are not known at receiving neuron $n_i$, then these values can be conveyed by respective pulse signals, indicated here by spike trains $s_k$ and $s_j$. The state of the receiving neuron $n_i$ at time t=T is determined by signals received on its incoming links during the first time period T. This neuron then generates an output signal during the next time period such that the time interval $X_{i,1}$ indicates the value of its membrane potential $V_{i,1}$ at time t=T. Again, the weight $w_{pi}$ associated with an outgoing link of neuron $n_i$ can be conveyed by a spike train $s_i$ if not known at a receiving neuron $n_p$.

Calculation of the membrane potential $V_i$ of neuron $n_i$ at time t=T is illustrated in the lower timeline of FIG. 3 for the incoming signals from $n_k$ and $n_j$ shown in the upper timeline. The shaded intervals here indicate the allocated range $\Delta T$ for transmitting the weight signals $s_k$ and $s_j$. In embodiments where weights are known at the receiving neuron, these signals reduce to a single pulse at time $X_k$ or $X_j$ respectively. In the example here, the weight signals are 4-bit binary pulse trains which encode the weights as Formulas 2 and 3 reproduced below:

$$w_{ik} = \sum_m w_{ik,m} 2^m = 2, \text{ whereby } w_{ik,1} = 1; \text{ and} \qquad \text{Formula 2}$$

$$w_{ij} = \sum_m w_{ij,m} 2^m = 5, \text{ whereby } w_{ij,2} = 1 \text{ and } w_{ij,0} = 1. \qquad \text{Formula 3}$$

As indicated by the bold line in the figure, the state of neuron $n_i$ at the end of the time period T=1024 $\Delta T$ is thus determined by the expression represented by Formula 4:

$$V_i \approx X_i = (X_j w_{ij} + X_k w_{ik}) = 4X_j + 1X_j + 2X_k \qquad \text{Formula 4}$$

Figure 4:
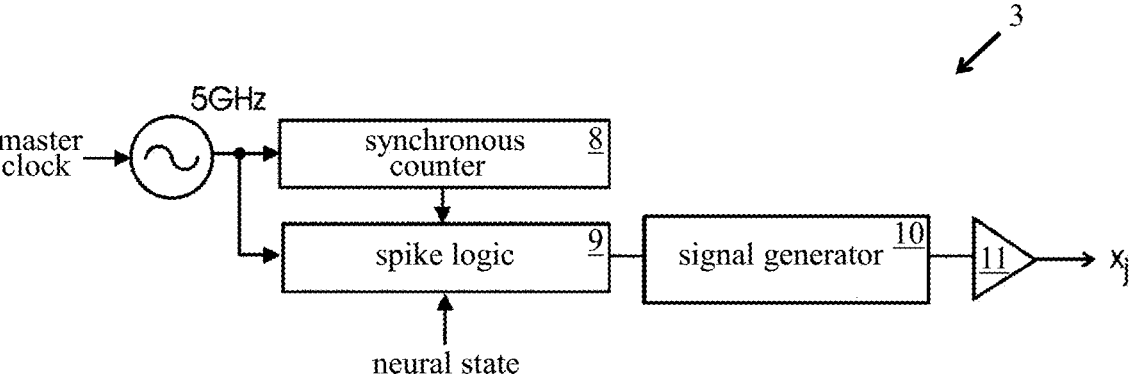
FIG. 4 shows components of a digital transmitter in the TTS embodiment.
Figure 5A:
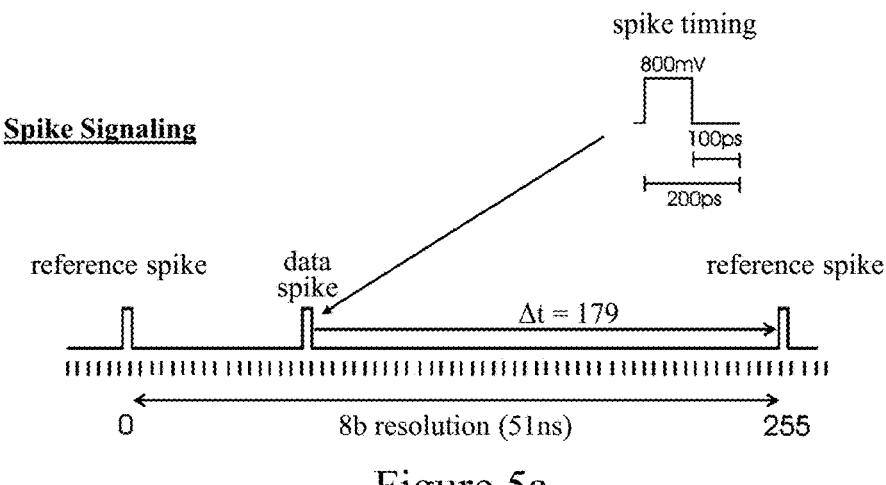
FIGS. 5*a*, 5*b*, 6*a* and 6*b* illustrate different signaling schemes in operation of the TTS embodiment.
Figure 5B:
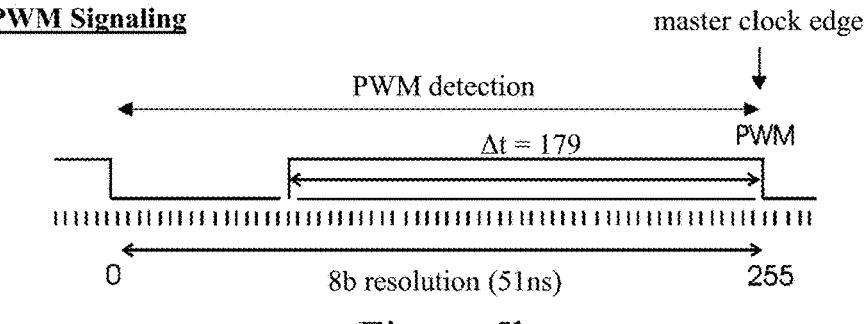

FIG. 4 shows an implementation of the digital transmitter 3 of neuron 2 for the TTS encoding scheme. This embodiment assumes that all weights for incoming links are known at the neuron receiver 4. The transmitter 3 comprises a synchronous counter 8 and spike logic 9 which receive a master clock signal, here of 5 GHz. The spike logic 9 receives the neural state from digital receiver 4 and controls generation trigger signals by a signal generator 10. In this embodiment, the transmitter 3 may use spike signaling or PWM (Pulse-Width Modulation) signaling as shown, respectively, in FIGS. 5a and 5b. At the start of each period T, a reference spike (FIG. 5a) or falling edge of the PWM signal (FIG. 5b) is generated by signal generator 10 under control of spike logic 9. The synchronous counter 8 counts until the appropriate time interval $\Delta t$ defining the current neural state, here $\Delta t$=179, is defined up to the end of period T. When the appropriate count is reached, the spike logic 9 controls signal generator 10 to generate a spike (data spike in FIG. 5a) or rising edge of the PWM signal (FIG. 5b). Spike/edge timing here may be triggered by either the rising or falling edge of the master clock signal. The resulting trigger signal, denoted here by $x_j$, is thus transmitted (here via a buffer 11) over outgoing links of the neuron.

Figure 6A:
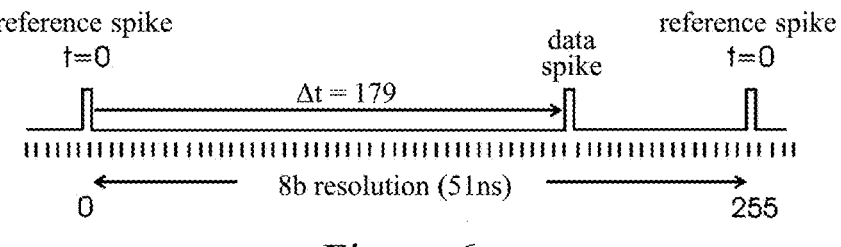
Figure 6B:
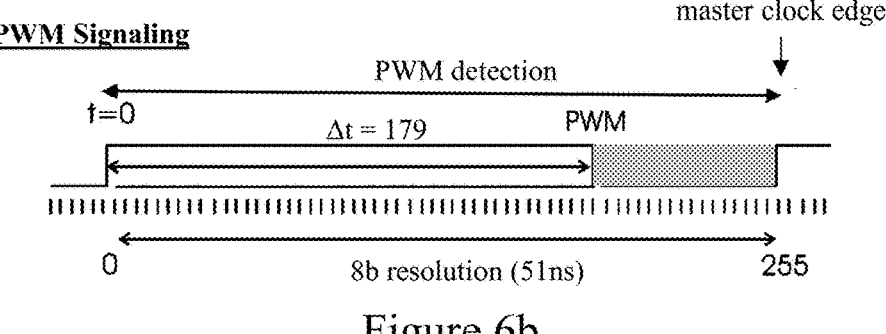

In the signaling schemes of FIGS. 5a and 5b, the trigger signal $x_j$ defines the time interval $\Delta t$ with reference to the end of the period T, whereby the accumulation phase at the receiver (described below) can start immediately after signal detection. This offers minimum latency in operation, but requires prior de-skewing, or skew calibration, of the incoming links. An alternative implementation is shown in FIGS. 6a and 6b where the trigger signal $x_j$ defines the time interval $\Delta t$ with reference to the start of the period T. Here, the shaded interval in FIG. 6b shows that there is a guard band to the master clock edge. Provided that the guard band sufficiently covers the maximum delay spread, no skew calibration of links is required. This offers a robust implementation in the presence of delay spread.

The start/stop spike signaling approach has the advantage that evaluation occurs on the same clock edge (eighter rising or falling) as opposed to PWM where both edges are evaluated. The single clock-edge solution is less prone to bimodal jitter. However, PWM signaling may be more efficient in some embodiments because of the 50% reduced edge density. In particular, dynamic power dissipation in CMOS (Complementary Metal-Oxide-Semiconductor) circuits is directly related to the number of signaling edges.

Figure 7:
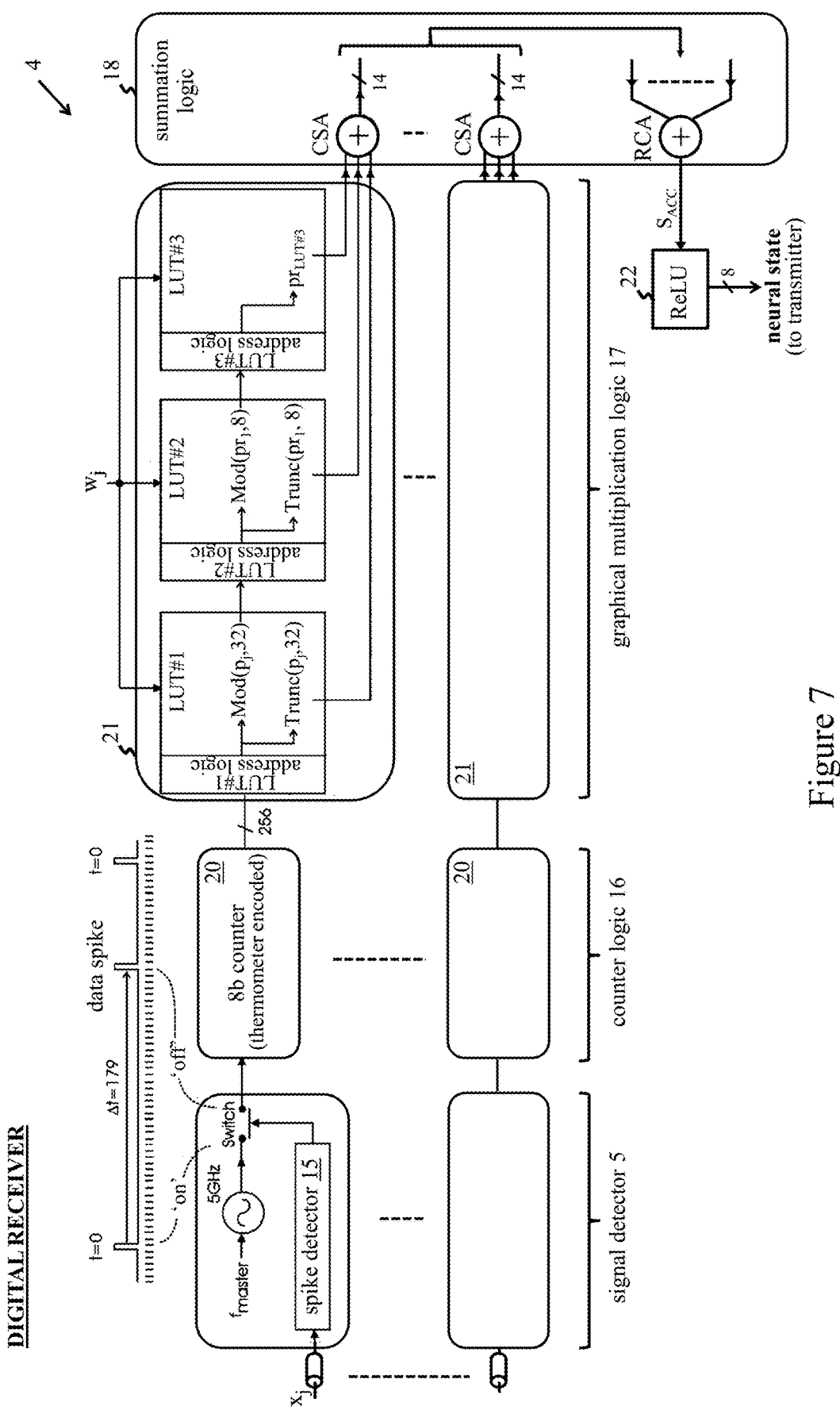
FIG. 7 shows components of a digital receiver in the TTS embodiment.

In receiver 4 of this embodiment, the digital accumulator logic 6 is adapted to generate weighted signals, as described above, from trigger signals received on incoming links, and to accumulate these weighted signals periodically, with period T, to determine the state of the neuron at the end of each period T. The transmitter 3 then generates a trigger signal $x_j$ indicating that state during the next period T. FIG. 7 shows an implementation for the receiver 4 of this embodiment. The signal detector 5 is implemented here, for each incoming link, by a spike detector 15 which detects a received trigger signal (here a spike signal of the FIG. 6a scheme) and closes a switch for the time interval $\Delta t$ defined by that signal. The digital accumulator logic 6 comprises counter logic, indicated generally at 16, graphical multiplication logic indicated at 17, and summation logic indicated at 18. The counter logic 16 is implemented by an 8-bit thermometer encoded counter 20 for each incoming link, where the counter 20 is connected to the output of the switch in signal detector 5 for that link. The counter 20 thus generates a thermometer-encoded output value dependent on the time interval $\Delta t$, as defined by the input trigger signal, for which the switch is closed, and the counter is connected to the master clock. The graphical multiplication logic 17 comprises, for each incoming link, a graphical multiplier 21 which receives the 256-bit thermometer-encoded output value from counter 20 for that link. The graphical multiplier 21 is adapted to multiply the counter output value by the weight $w_j$ associated with that incoming link (where $w_j$ is assumed to be known here and can be prestored in a register (not shown) of the receiver). The graphical multiplication operation produces a set of components of the weighted signal for the link in the form of partial products, explained in more detail below. The summation logic 18 sums these components to generate the weighted signal for each incom- <table>
<tr><td>7</td><td>8</td></tr>
</table> ing link, and then sums the weighted signals generated during each period T to produce an accumulated signal, denoted here by $S_{ACC}$, which indicates the neuron state. The accumulated signal $S_{ACC}$ is passed through an activation unit 22 comprising a non-linear element, here a rectified linear unit (ReLU), which applies a non-linear activation function to $S_{ACC}$ to obtain the neural state supplied to transmitter 3.

In this embodiment, graphical multiplier 21 employs an LUT (Lookup Table)-based graphical multiplication technique using a plurality of lookup tables storing values of the aforementioned components (partial products) for possible values of the thermometer-encoded output value from counter 20. Here, the graphical multiplier uses three lookup tables labeled LUT #1, LUT #2 and LUT #3. LUT #1 receives the (256=2^8)-bit thermometer-encoded output value referred to in the following as $x_j$, and determines the partial product obtained when overlaying $x_j$ with a coarse grid with a 32-bit step size. The residual vector is then processed in LUT #2 with an 8-bit step size, and finally LUT #3 determines the final residual with a 1-bit step size. The graphical multiplication operation is illustrated in detail in FIGS. 8 through 10 for an example with $x_j$=179 and $w_j$=43.

FIG. 8 explains the operation in LUT #1 which has ten addressable entries (the last entry corresponding to two possible outputs as indicated). The thermometer-encoded value $x_j$ is received by the LUT address logic which identifies the address in this LUT containing the partial product $pr_1$, and residual vector $r_{LUT\ \#1}$, resulting from the first multiplication step with $x_j$=179 and $w_j$=43. Hence, LUT #1 generates two outputs as follows represented by Formulas 5 and 6:

$$\text{Output\_A of } LUT\ \#1:\ pr_1 = \text{Truncate}(p_j, 32), \text{ and} \qquad \text{Formula 5}$$

$$\text{Output\_B of } LUT\ \#1:\ r_{LUT\#1} = \text{Mod}(p_j, 32), \qquad \text{Formula 6}$$

where $p_j=x_j*w_j$ with * denoting multiplication here. In this example with $x_j$=179 and $w_j$=43, the resulting LUT entries are shown shaded in the figure, i.e., LUT Address=00000100; $pr_1$=(43*160)=6880 (where 160 corresponds to five fully-populated 32-bit bins); and $r_{LUT\ \#1}$ is a 32-bit residual vector with 19 logical 1's followed by 13 logical 0's. The partial product $pr_1$ from Output_A is supplied to summation logic 18, and the residual vector $r_{LUT\ \#1}$ from Output_B is passed on to LUT #2. Note that, for ease of representation in the figure, LUT entries for Output_A are given as decimal numbers. In the hardware implementation, however, numbers are stored in binary two's-complement format for processing in summation logic 18 as explained below. Also, only the range of the bit-positions of the residual vector $r_{LUT\ \#1}$ is shown for Output_B. In the hardware implementation, not the bit-positions but the bit values at those positions are passed on to LUT #2.

FIG. 9 explains the operation in LUT #2 which has six addressable entries. The residual vector $r_{LUT\#1}$ from LUT #1 is received by the LUT address logic which identifies the address containing the partial product $pr_2$ and residual vector $r_{LUT\ \#2}$ resulting from the second multiplication step represented by FIGS. 7 and 8:

$$\text{Output\_A of } LUT\#2:\ pr_2 = \text{Truncate}(pr_{LUT\#1}, 8), \text{ and} \qquad \text{Formula 7}$$

Figure 10:
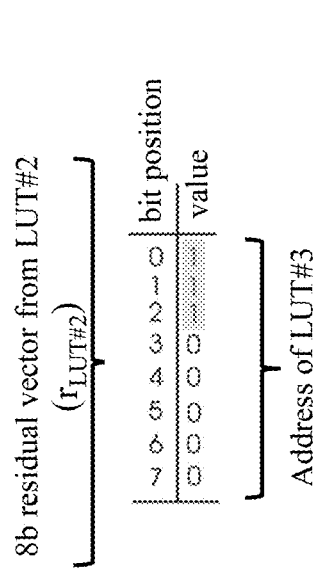

-continued
$$\text{Output\_B of } LUT\#2:\ r_{LUT\#2} = \text{Mod}(pr_{LUT\#1}, 8), \qquad \text{Formula 8}$$

where $pr_{LUT\ \#1}=r_{LUT\ \#1}*w_j$, with $r_{LUT\ \#1}$=19 and $w_j$=43 here. Hence, Output_A=(43*16)=688 (where 16 corresponds to two fully populated 8-bit bins), and Output_B is an 8-bit residual vector with 3 logical 1's followed by 5 logical 0's. The partial product $pr_2$ of Output_A is supplied to summation logic 18, and the residual vector $r_{LUT\ \#2}$ of Output_B is passed to LUT #3. LUT #3 has 7 addressable entries as shown in FIG. 10. This LUT determines the partial product $pr_{LUT\ \#3}=r_{LUT\ \#2}*w_j$, with $r_{LUT\ \#2}$=3 and $w_j$=43 here, and provides the result as Output_A to summation logic 18. Hence, Output_A=(43*3)=129 in this example. As will be apparent to those skilled in the art, the number of partial product values stored in this implementation (23 in total) can be easily reduced at the cost of more LUTs and data processing overhead.

Returning to FIG. 7, the summation logic 18 comprises, for each incoming link, a 14-bit carry-save adder (CSA) which receives the partial products (Output_A) from the three LUTs of graphical multiplier 21. For the example above, the output of the CSA equals 6880+688+129=7697, correctly computing $x_j*w_j$=179*43=7697 (where $x_j$ has 8-bit resolution and $w_j$ has 6-bit resolution). The CSA output for each incoming link thus provides a weighted signal $x_j*w_j$ which is dependent on the time interval encoded in the input trigger signal and the weight associated with that incoming link. Note that the LUTs provide outputs (Output_A's) directly in the required two's-complement format for CSA operation. As is well known in the art, a basic CSA stage can sum three binary input strings to produce two bit-strings corresponding respectively to the sum and carry bits from the addition. Where more than three numbers are to be summed, a CSA adder can be implemented as an adder tree in which basic CSA adder stages are cascaded to obtain the final sum and carry bit-strings after all additions. In the present case, the CSA adder sums three two's complement format partial products from the LUTs to obtain the 14-bit sum and carry outputs (represented in FIG. 7 by a single output) from the addition.

The CSAs for all incoming links (e.g., 250 or 780 links) provide their outputs to a final ripple-carry adder (RCA) of summation logic 18 which computes the final sum of all weighted signals $x_j*w_j$ to obtain the accumulated signal $S_{ACC}$. Resolution of the carry bits for the individual summations is thus deferred to the final RCA stage for highly-efficient computation and reduced power consumption due to arithmetic ripples in the addition. The RCA can be efficiently implemented by a 14-bit Kogge-Stone adder. After application of the ReLU function to $S_{ACC}$ in activation unit 22, the resulting 8-bit neural state is passed to transmitter 3.

It will be seen that the above embodiment provides a neuron in which transmitted neural state information is encoded in the length of a time interval, and this time interval is measured by digital counter logic at the neuron receiver. The neuron operates wholly in the digital domain, avoiding the need for analog-to-digital converters and the calibration of analog components. Pure CMOS implementations are possible, and circuit components can be readily described in VHDL (Very High-Speed Integrated Circuit Hardware Description Language) for synthesis. The circuit is modular and scalable due to the reference/data-spike concept (like PWM signaling), and synchronous operation is readily achievable with local frequency-multiplying PLLs (Phase-Locked Loops) for spike/PWM generation/detection in the transmitter and receiver. The receiver outputs directly provide two's-complement data due to LUT-based multiplication, whereby no data format conversion is required. This embodiment thus offers an efficient, fully digital realization of TTS-encoded SNNs. Close approximation of the performance offered by non-spiking artificial neural networks is readily achievable.

Figure 11:
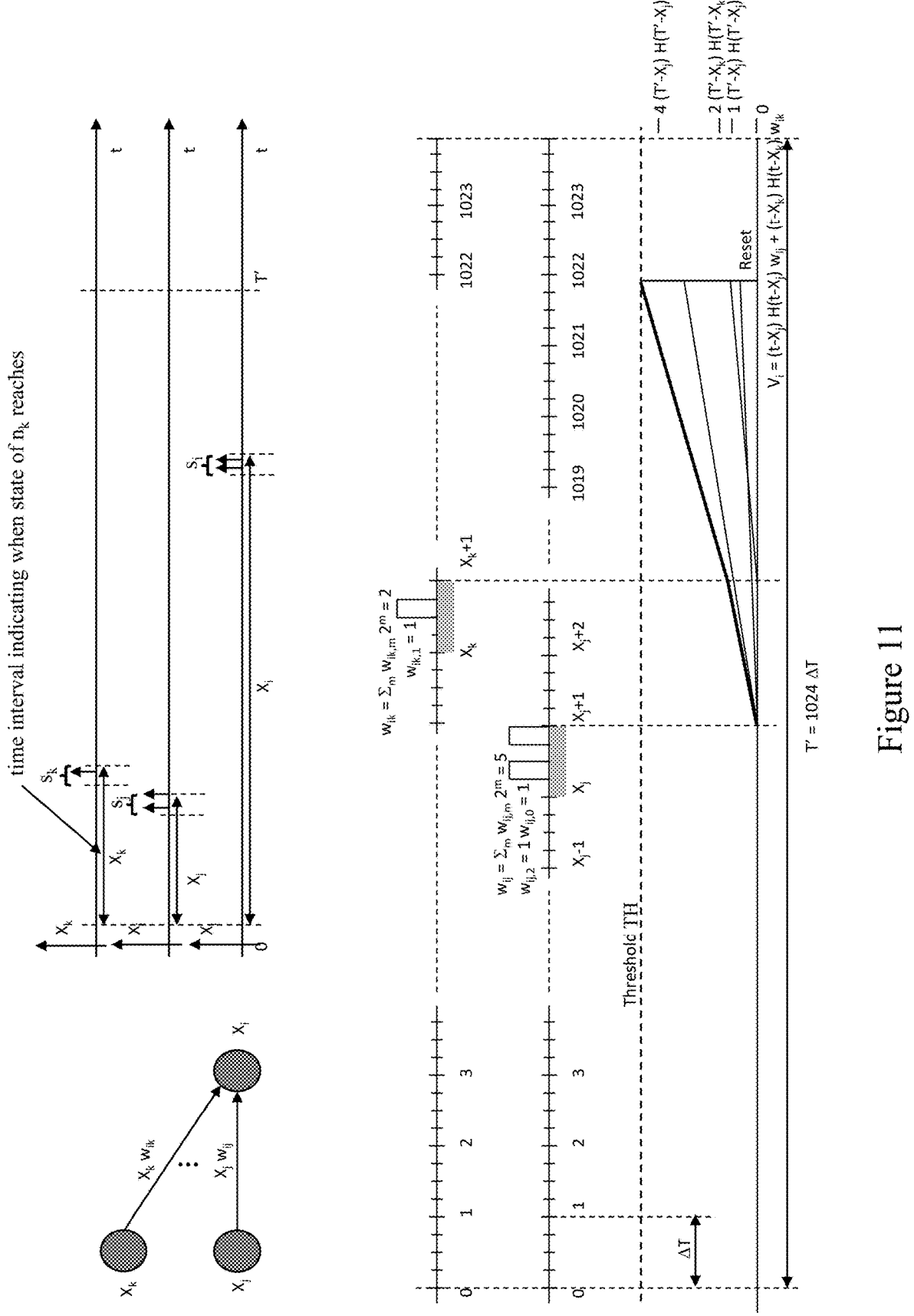
FIG. 11 illustrates operation of a TTFS encoding scheme implemented by further embodiments of the neuron circuit.

FIG. 11 illustrates a TTFS encoding scheme implemented by further embodiments of the FIG. 2 neuron. In TTFS encoding, a neuron spikes (generates an output signal) when its membrane potential reaches a given threshold, and afterwards it remains silent. The spiking time $t_i$ of a neuron $n_i$, receiving trains of spikes at times $t_p$, satisfies Formula 9:

$$TH = \sum_p w_{ip}(t_i - t_p)H(t_i - t_p), \ 0 \le t < T', \qquad \text{Formula 9}$$

where TH is the firing threshold, $w_{ip}$ are the synaptic weights for incoming links, and $H(t)$ is the Heaviside function. If no solution exists for $t_i$, the neuron spikes at time $t=T'$ with probability $P \in [0,1]$. The time at which the states of neurons $n_k$, $n_j$ and $n_i$ reach the threshold TH determines a corresponding time interval (denoted by $X_k$, $X_j$ and $X_i$ respectively in the upper left corner of the figure) associated with output spike signals generated by each neuron in each of successive time periods T', where T' denotes the maximum value of the (non-leaky) integration time to complete one iteration of neuron operation. Thus, as shown in the upper timeline in the figure, neuron $n_k$ generates a spike signal at time $t_k$, after time interval $X_k$, when its membrane potential $V_k$ traverses the threshold TH. Similarly, neuron $n_j$ generates a spike signal at time $t_j$, after time interval $X_j$, when its membrane potential $V_j$ traverses the threshold. As before, if the values of synaptic weights $w_{ik}$ and $w_{ij}$ are not known at receiving neuron $n_i$, then these values can be conveyed by respective pulse signals indicated by spike trains $s_k$ and $s_j$. The state of the receiving neuron $n_i$ is determined by signals received on its incoming links during the time period T'. This neuron generates an output signal during that time period, after a time interval $X_i$, when its membrane potential $V_i$ traverses TH. Again, the weight $w_{pi}$ associated with an outgoing link of neuron $n_i$ can be conveyed by a spike train $s_i$ if not known at a receiving neuron $n_p$.

Calculation of the membrane potential $V_i$ of neuron $n_i$ during a time period T' is illustrated in the lower timeline of FIG. 11 for the incoming signals from $n_k$ and $n_j$ shown in the upper timeline. (As before, the shaded intervals indicate the allocated range $\Delta T$ for transmitting the weight signals $s_k$ and $s_j$. Weights are encoded in these signals as for the TTS scheme of FIG. 3. Where the weights are known at the receiving neuron, these signals reduce to a single pulse at time $X_k$ or $X_j$ respectively). The state of neuron $n_i$ during the time period T'=1024 $\Delta T$ is given by:

$$V_i = (t - X_j)H(t - X_j)w_{ij} + (t - X_k)H(t - X_k)w_{ik} \qquad \text{Formula1 10}$$

as represented by the bold line in the figure. The neuron fires during T' if $V_i$ reaches TH, otherwise if fires at t=T' with probability P. If P=0, the neuron remains silent.

Figure 12:
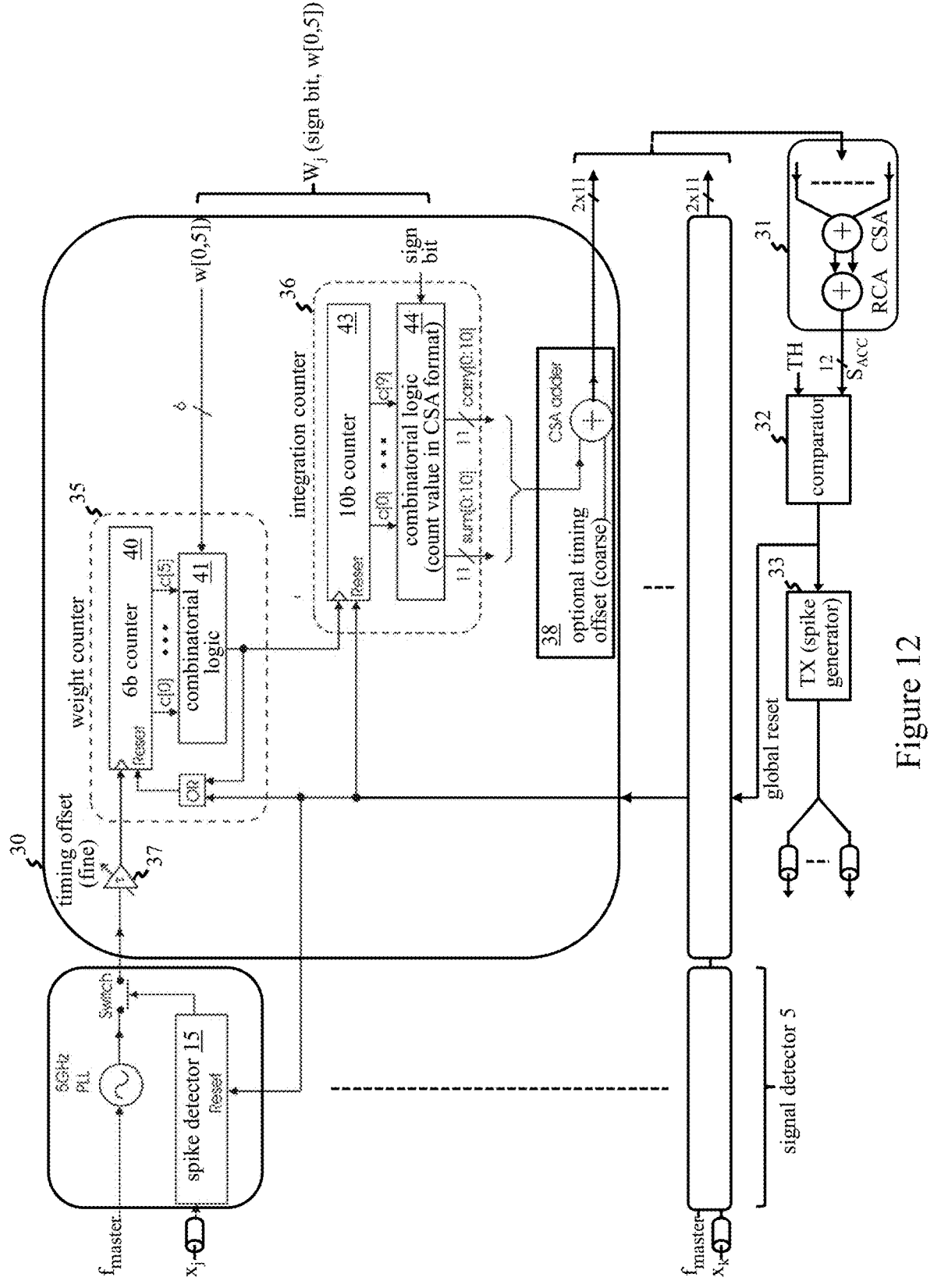
FIG. 12 shows components of neuron circuit in a first TTFS embodiment.

Neurons 2 for implementing the TTFS encoding scheme are described below with reference to FIGS. 12 to 14. In these embodiments, the digital accumulator logic 6 is adapted, during each of successive time periods T', to generate weighted signals from trigger signals received on incoming links, to accumulate these weighted signals to produce an accumulated signal $S_{ACC}$, and to progressively compare the accumulated signal with a threshold TH to determine the neural state during that period T'. The transmitter is then adapted to generate a trigger signal during the period T' in response to the accumulated signal traversing the threshold TH FIG. 12 shows a first neuron implementation for TTFS encoding. The signal detector 5 is implemented as in the FIG. 7 embodiment above, comprising a spike detector 15, for each incoming link, which detects a received trigger signal and closes a switch. The digital accumulator logic of this embodiment comprises a digital integrator 30 for each incoming link, summation logic 31, and a comparator 32. The digital integrator 30 is adapted, in response to detection of a trigger signal on the incoming link, to start integrating a value dependent on the weight $w_{ij}$ associated with that link to generate the weighted signal for that link. The weighted signal thus depends on the link weight $w_{ij}$ and the time at which the transmitting neuron $n_j$ fired (i.e. the end of time interval $\Delta t$ encoded in the input trigger signal $x_j$). The summation logic 31 then sums the weighted signals generated during each period T' for all incoming links to produce the accumulated signal $S_{ACC}$. The weights $w_{ij}$ for incoming links are assumed to be known and prestored in registers (not shown) of the receiver.

In this embodiment, the digital integrator 30 comprises concatenated counters, namely a weight counter 35 and an integration counter 36. Link weights $w_{ij}$ for this implementation are stored in the form of 6-bit values $W_j=(w_{max}-w_{ij})$, where $w_{max}$ is a predefined maximum value, and are represented in sign-magnitude format, i.e., $W_j$(sign bit, w[0,5]). On detection of a spike on an incoming link, spike detector 15 closes the switch so that the master clock edges are fed to weight counter 35. (Because TTFS relies on a single spike, any propagation delay differences between incoming links can be mitigated via an adjustable timing offset, indicated as analog fine timing offset 37 and digital coarse timing offset 38 in the figure). The weight counter 35 comprises a 6-bit counter 40 which provides output bits c[0] to c[5] to combinatorial logic 41 which also receives the weight bits w[0,5]. The combinatorial logic 41 generates an output pulse whenever the count c[0] to c[5] reaches the weight value w[0,5]. This pulse is supplied to integration counter 36, and resets the counter 40 which starts counting again. The pulses from weight counter 35 thus define the update rate of integration counter 36.

Integration counter 36 comprises a 10-bit counter 43 which is progressively incremented to perform the integration, i.e., to calculate $p_j(t)=w_j*(t-X_j)$, $t>X_j$. The integrator count value $p_j(t)$ can be positive or negative depending on the sign bit of $W_j$ which is supplied to combinatorial logic 44 of integration counter 36. The combinatorial logic 44 provides the integrator count value in CSA format as a sum vector (sum[0,10]) and a carry vector (carry[0,10]). A negative value is generated by a bit inversion of the output of counter 43 in conjunction with addition of a logical 1 in the carry vector. Optional coarse timing adjustment is applied at CSA adder block 38, and the resulting weighted signal $w_j*(t-X_j)$, $t>X_j$, is output in CSA format to summation logic 31.

The summation logic 31 comprises a carry-save adder tree followed by a ripple-carry adder (e.g., a Kogge-Stone adder) which sums the integrator outputs from all incoming links and supplies the resulting accumulated signal $S_{ACC}$ to the comparator 32. If $S_{ACC}$ traverses the threshold TH, the comparator outputs a global reset signal to reset all counters in integrator 30. The comparator output is also supplied to a transmitter, in the form of spike generator 33, which then generates a spike signal on outgoing links of the neuron.

Figure 13:
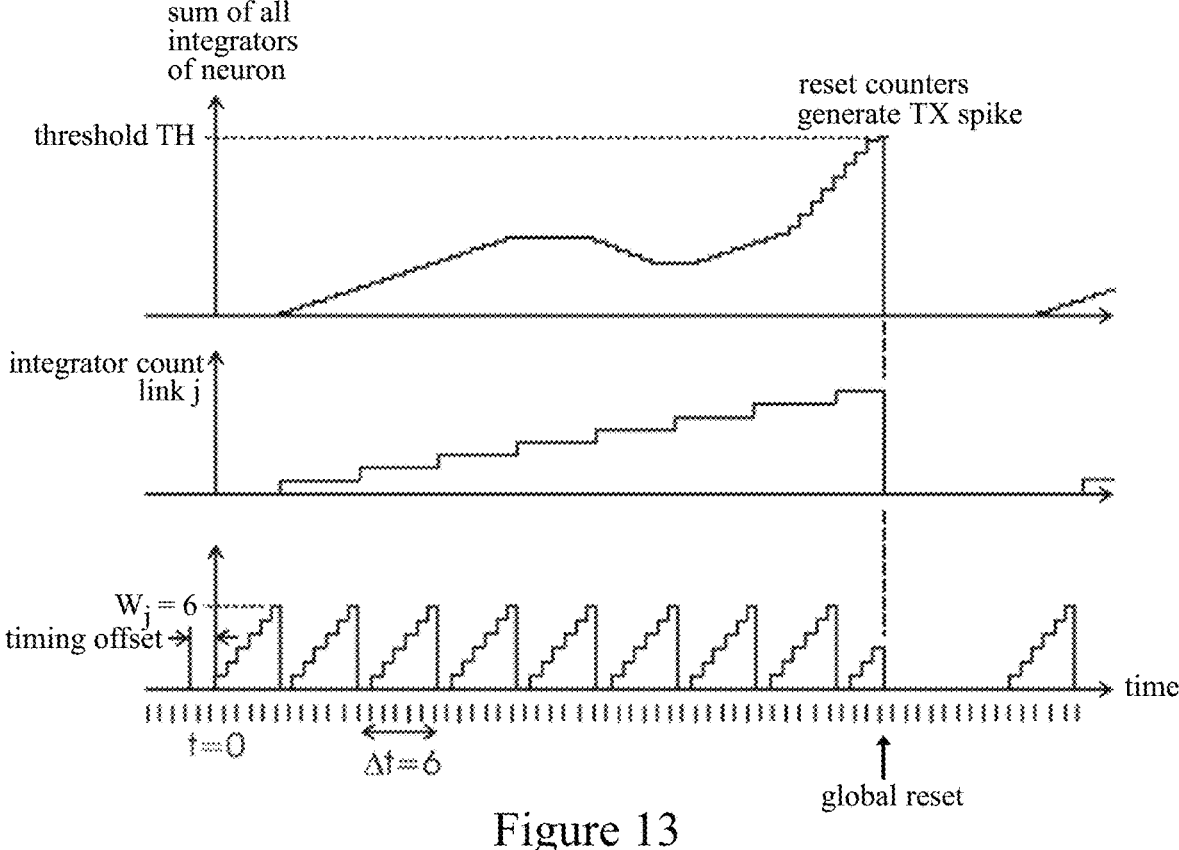
FIG. 13 illustrates operation of digital accumulator logic in the FIG. 12 embodiment.

The integration operation in the FIG. 12 embodiment is illustrated schematically in FIG. 13. The lower trace here shows operation of the weight counter 35 for a link with $W_j=6$. The count in integration counter 36 for the link is shown in the next trace up, where it can be seen that the weight counter controls the integrator steepness. In this implementation, a higher link weight $w_{ij}$ (and hence lower weight value $W_j$ as defined above) increases the integrator steepness. The top trace here illustrates the accumulated output signal over all neuron integrators, with the neuron spiking and global reset occurring when $S_{ACC}$ reaches the firing threshold TH.

Figure 14:
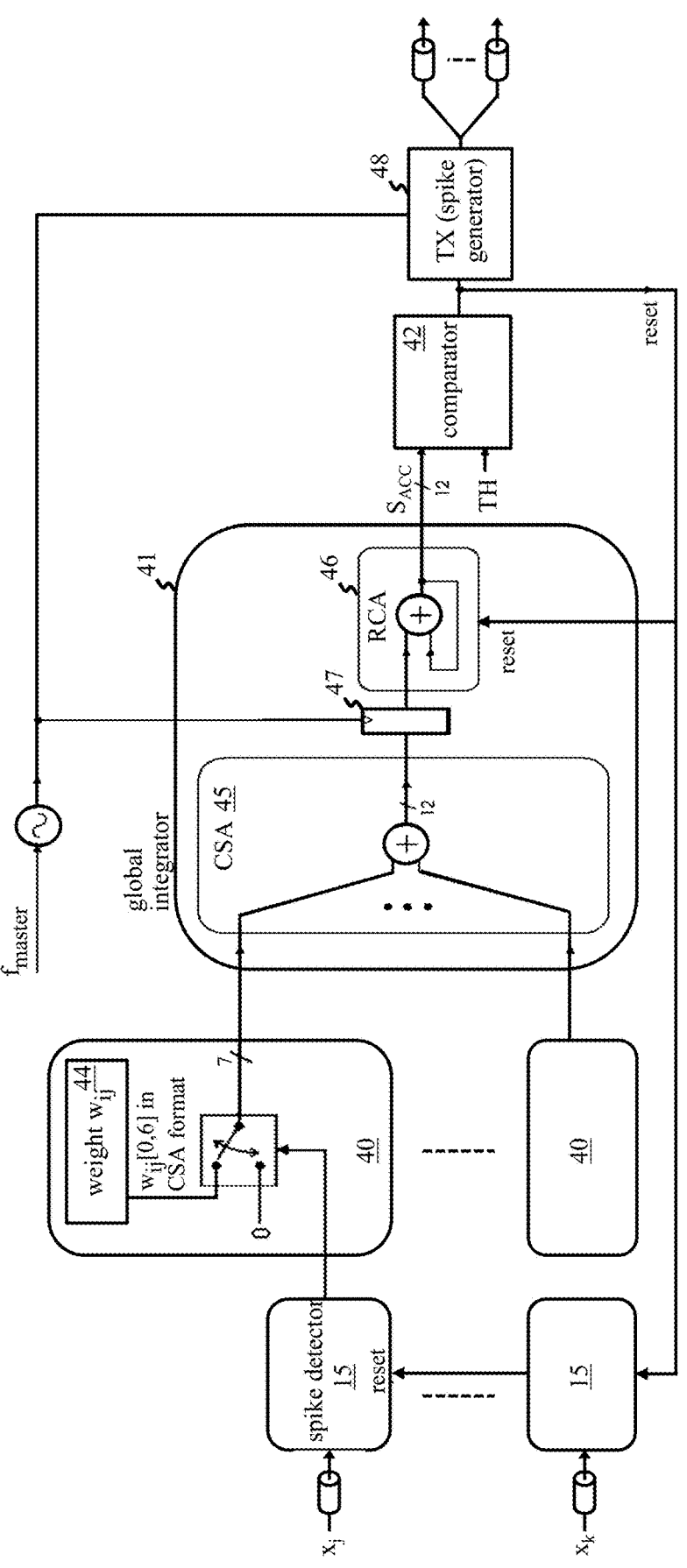
FIG. 14 shows components of neuron circuit in a second TTFS embodiment.

FIG. 14 shows another neuron implementation for TTFS encoding. The signal detector comprises a spike detector 15 for each incoming link. The digital accumulator logic of this embodiment comprises weighting logic 40 for each incoming link, a digital integrator 41 and a comparator 42. The weighting logic 40 is adapted to generate the weighted signal for a link by outputting a weight value, dependent on the weight associated with that link, in response to detection of a trigger signal on that link. In particular, weight logic 40 comprises a register 44 storing the weight value $w_{ij}$ for the link, and a switch controlled by spike detector 15 for the link. When an input spike is detected, the switch is closed and the weight $w_{ij}$ is supplied in CSA format to one input of a CSA adder tree 45 in digital integrator 41. The CSA 45 thus accumulates the weights at the outputs of weight logic 40 for the incoming links to produce a sum value. This sum value is supplied to one input of a ripple-carry adder 46 whose output is fed back to a second input. A timer unit 47, clocked by the master clock signal, provides the current CSA sum value to RCA 46, whereby the RCA progressively accumulates the sum value during the time period T'. The resulting accumulated signal $S_{ACC}$ is compared with TH by comparator 42. When $S_{ACC}$>TH, the comparator outputs a global reset signal to reset the receiver and trigger generation of a spike signal by spike generator 48.

The embodiments of FIGS. 12 and 14 provide digital neuron implementations for realization of fully digital TTFS-encoded SNNs. In addition to advantages described earlier for TTS embodiments, these implementations are conceptually simple with low complexity of weight programming. Low area implementation is possible because weights are stored in simple registers and no LUTs are required. While the switching activity is higher than in a multiplier approach with LUTs, this comes with a smaller overall area and hence fewer local interconnects. The FIG. 14 embodiment offers an exceptionally efficient implementation through provision of a global digital integrator 41 for all incoming links of the neuron.

Figure 15:
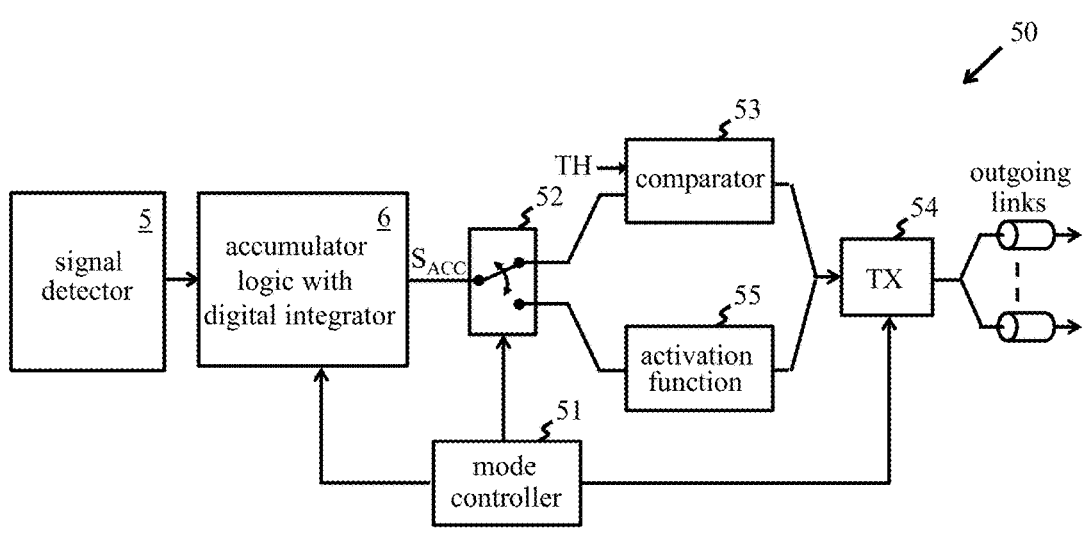
FIG. 15 illustrates neuron circuit structure for selective operation in TTS and TTFS encoding modes.

The TTFS embodiments described are also readily reconfigurable for TTS encoding as illustrated in FIG. 15. This shows components of a reconfigurable neuron 50 in which the digital accumulator logic 6 is implemented with digital integrators, as in FIG. 12 or 14, to generate the accumulated signal $S_{ACC}$. Mode control logic 51 controls selective operation of the circuit in a first, TTFS encoding mode and a second, TTS encoding mode. In the TTFS mode, the accumulated signal $S_{ACC}$ is supplied, via switch 52, to a comparator 53 which operates like comparators 32 and 42 of the TTFS embodiments above. Hence, $S_{ACC}$ is progressively compared with the threshold TH and transmitter 54 outputs a spike signal if the threshold is traversed during each of successive time periods T'. In the TTS mode, the digital accumulator logic outputs the accumulated signal $S_{ACC}$ at the end of each period T'. This signal is supplied, via switch 52, to activation unit 55 which outputs the neural state to transmitter 54. The transmitter then generates a trigger signal indicating that state during the next period T'.

Selective operation in both TTFS and TTS modes is an extremely attractive option for SNN implementations. TTS embodiments are well-suited to efficient implementation of iterative algorithms, e.g., message passing algorithms, using non-local timing reference, or classification algorithms, where a continuous stream of input data, e.g., images, needs to be processed. TTFS embodiments are well-suited to low-latency classification algorithms, where the neuron corresponding to the correct class fires first among the output layer neurons. Providing both options in a single SNN implementation is thus highly advantageous.

Figure 16:
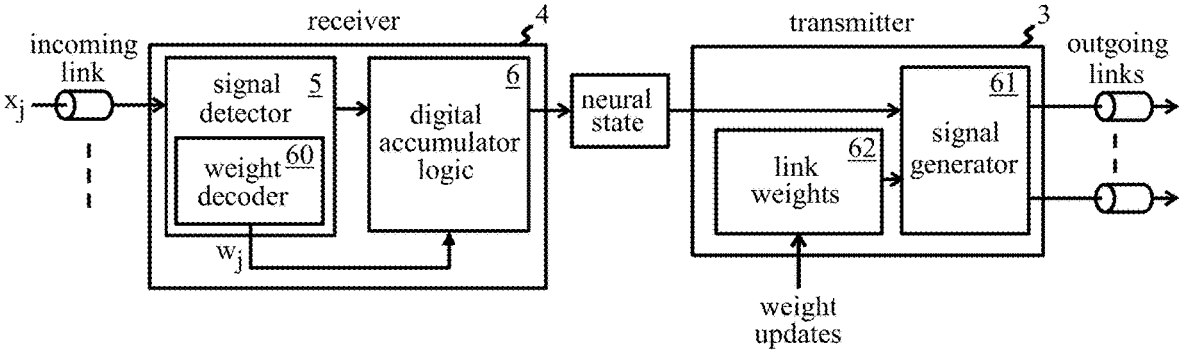
FIG. 16 shows additional features of neuron circuits embodying the invention accommodating variable weights for SNN links.

While the detailed operation has been described assuming that weights are known at the receiver, the embodiments above can be readily adapted to accommodate transmission of weight values via the weight signals shown in FIGS. 3 and 11. FIG. 16 is a schematic illustration of a neuron circuit with such functionality, where components described above are indicated by like references in this figure. For each incoming link of receiver 4, the signal detector includes weight decoder logic 60 which decodes the weight $w_j$ encoded in a weight signal $s_j$ embedded in an incoming trigger signal and supplies this dynamically to digital accumulator logic 6. In the transmitter 3, a signal generator 61 receives the neural state for controlling generation of trigger signals on the outgoing links. The transmitter also receives and stores current values 62 of the weights for respective outgoing links. The outgoing link weights may be periodically updated in operation, e.g., during a network training operation. The signal generator 61 is operable, for each outgoing link, to encode the weight $w_p$ associated with that link in a pulse signal $s_p$ embedded in the trigger signals generated on that link. In some embodiments, neurons may be operable in both a training mode and an inference mode. In the training mode, weights are periodically updated and hence transmitted with outgoing trigger signals. In the inference mode, weights are no longer updated and fixed weights are then stored at the receiver.

Figure 17:
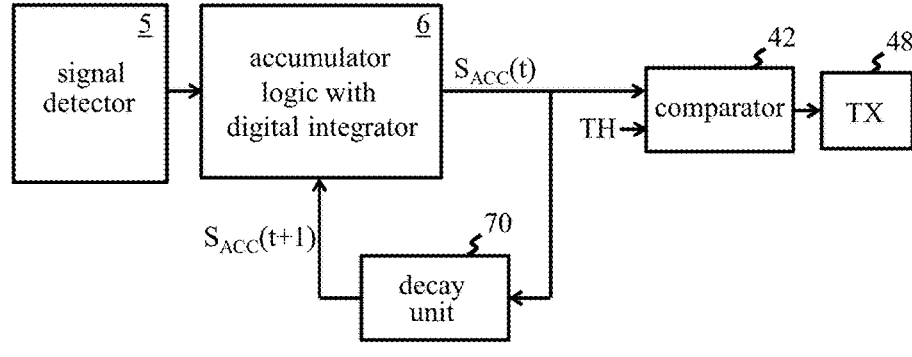
FIG. 17 illustrates implementation of a leaky neuron circuit embodying the invention.

Embodiments can also be adapted to implement a so-called "leaky neuron" circuit, whereby the neuron membrane potential decays with time according to some predetermined function. This is illustrated schematically in FIG. 17 for an example based on the FIG. 14 neuron. The accumulated signal $S_{ACC}(t)$ output by RCA unit 46 of FIG. 14 is supplied to a decay unit 70 which implements the desired leaky neuron function. The output $S'_{ACC}(t+1)$ is then added to the output of timer unit 47 to obtain $S_{ACC}(t+1)$.

Various other changes and modifications can of course be made to the embodiments described above. Also, where features are described herein with reference to a neuron embodying the invention, corresponding features may be provided in SNN apparatus employing such neurons.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 18:
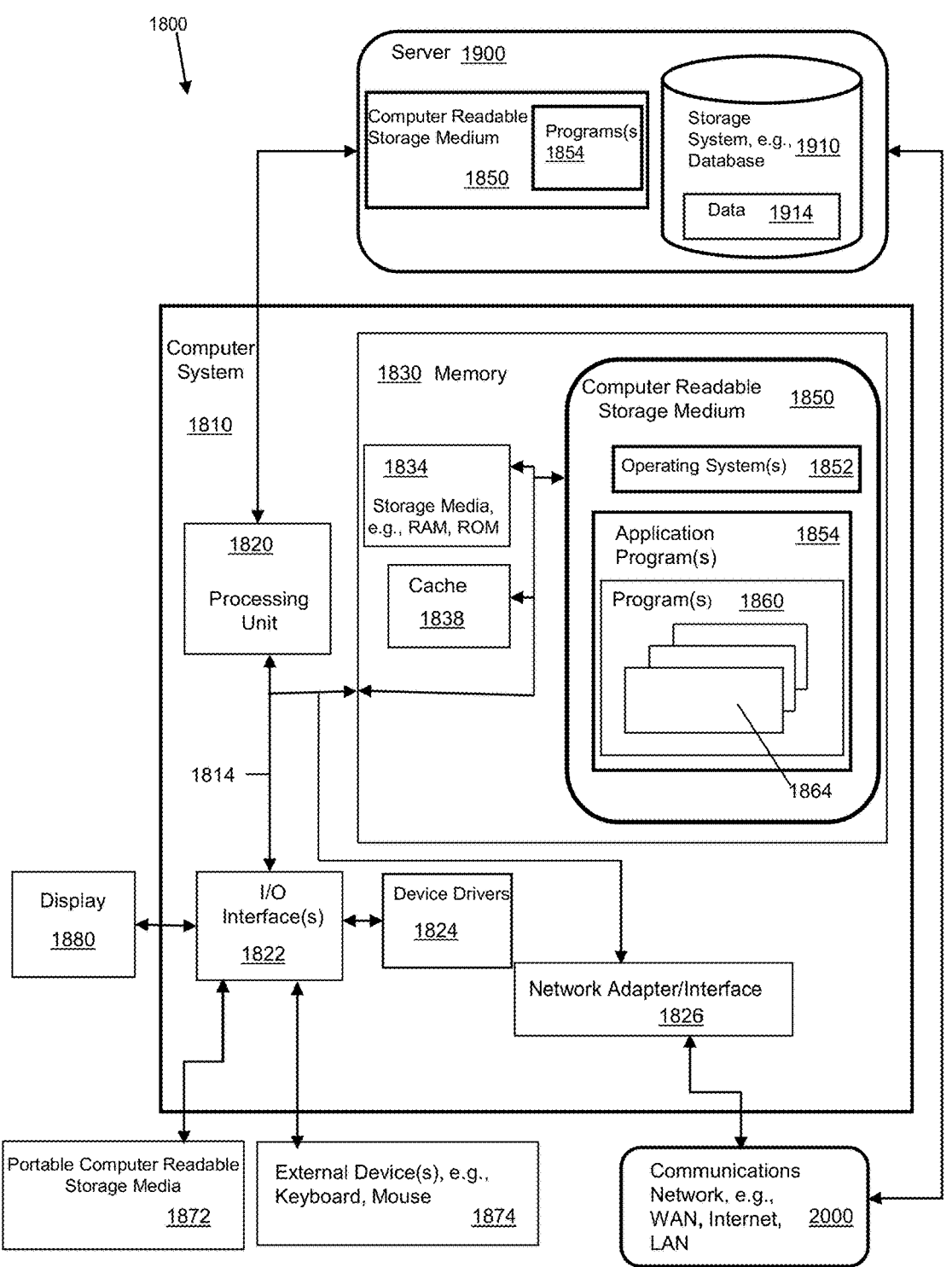
FIG. 18 is a block diagram of an example system, in accordance with an embodiment of the present invention.

FIG. 18 is a block diagram of an example system, in accordance with an embodiment of the present invention. Specifically, FIG. 18 discloses system 1800 which includes a computer system or computer shown in the form of a generic computing device (e.g., computer system 1810). The method of the present invention, for example, may be embodied in a program(s) 1860 embodied on a computer readable storage device, for example, generally referred to as memory 1830 and more specifically, computer readable storage medium 1850. For example, memory 1830 can include storage media 1834 such as RAM (Random Access Memory) or ROM (Read Only Memory), and cache memory 1838. The program 1860 is executable by the processing unit or processor 1820 of the computer system 1810 (to execute program steps, code, or program code). Additional data storage may also be embodied as a database which can include data 1914. The computer system 1810 and the program 1860 are generic representations of a computer and program that may be local to a user, or provided as a remote service (for example, as a cloud-based service), and may be provided in further examples, using a website accessible using the communications network 2000 (e.g., interacting with a network, the Internet, or cloud services). It is understood that the computer system 1810 also generically represents herein a computer device or a computer included in a device, such as a laptop or desktop computer, etc., or one or more servers, alone or as part of a datacenter. The computer system can include a network adapter/interface 1826, and an input/output (I/O) interface(s) 1822. The I/O interface 1822 allows for input and output of data with an external device 1874 that may be connected to the computer system. The network adapter/interface 1826 may provide communications between the computer system a network generically shown as the communications network 2000.

The computer 1810 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1860 for performing the tasks of each of the steps of the method and system. The modules are generically represented as program modules 1864. The program 1860 and program modules 1864 can execute specific steps, routines, sub-routines, instructions, or code, of the program.

Embodiments of the present disclosure can be run locally on a device such as a mobile device, or can be run a service, for instance, on the server 1900 which may be remote and can be accessed using the communications network 2000. The program or executable instructions may also be offered as a service by a provider. The computer 1810 may be practiced in a distributed cloud computing environment where tasks are performed by remote processing devices that are linked through a communications network 2000. In a distributed cloud computing environment, program modules may be located in both local and remote computer system storage media including memory storage devices.

More specifically, the system 1800 includes the computer system 1810 shown in the form of a general-purpose computing device with illustrative periphery devices. The components of the computer system 1810 may include, but are not limited to, one or more processors or processing units

1820, a system memory 1830, and a bus 1814 that couples various system components including system memory 1830 to processor 1820.

The bus 1814 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1810 can include a variety of computer readable media. Such media may be any available media that is accessible by the computer 1810 (e.g., computer system, or server), and can include both volatile and non-volatile media, as well as removable and non-removable media. Computer memory 1830 can include additional computer readable media 1834 in the form of volatile memory, such as random-access memory (RAM), and/or cache memory 1838. The computer 1810 may further include other removable/non-removable, volatile/non-volatile computer storage media, in one example, portable computer readable storage media 1872. In one embodiment, the computer readable storage medium 1850 can be provided for reading from and writing to a non-removable, non-volatile magnetic media. The computer readable storage medium 1850 can be embodied, for example, as a hard drive. Additional memory and data storage can be provided, for example, as the storage system 1910 (e.g., a database) for storing data 1914 and communicating with the processing unit 1820. The database can be stored on or be part of a server 1900. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method of the present invention, for example, may be embodied in one or more computer programs, generically referred to as a program 1860 and can be stored in memory 1830 in the computer readable storage medium 1850. The program 1860 can include program modules 1864. The program modules 1864 can generally carry out functions and/or methodologies of embodiments of the invention as described herein. The program 1860 may be the keyword system or the natural language processing system. The one or more programs 1860 are stored in memory 1830 and are executable by the processing unit 1820. By way of example, the memory 1830 may store an operating system 1852, one or more application programs 1854, other program modules, and program data on the computer readable storage medium 1850. It is understood that the program 1060, and the operating system 1852 and the application program(s) 1854 stored on the computer readable storage medium 1850 are similarly executable by the processing unit 1820.

The computer 1810 may also communicate with one or more external devices 1874 such as a keyboard, a pointing device, a display 1880, etc.; one or more devices that enable a user to interact with the computer 1810; and/or any devices (e.g., network card, modem, etc.) that enables the computer

1810 to communicate with one or more other computing devices. Such communication can occur via the Input/Output (I/O) interfaces 1822. Still yet, the computer 1810 can communicate with one or more networks 2000 such as a local area network (LAN), a general wide area network (WAN), and/or a public network (e.g., the Internet) via network adapter/interface 1826. As depicted, network adapter 1826 communicates with the other components of the computer 1810 via bus 1814. It should be understood that although not shown, other hardware and/or software components could be used in conjunction with the computer 1810. Examples, include, but are not limited to microcode, device drivers 1824, redundant processing units, external disk drive arrays, RAID systems, tape drives, and data archival storage systems, etc.

It is understood that a computer or a program running on the computer 1810 may communicate with a server, embodied as the server 1100, via one or more communications networks, embodied as the communications network 2000. The communications network 2000 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1810, including a mobile device, can use a communications system or network 2000 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A circuit comprising:

multiple neuron circuits interconnected by links in a spiking neural network apparatus, wherein each link is associated with a respective weight for transmission of signals between respective neuron circuits, wherein a neuron circuit of the multiple neuron circuits comprises:

a digital transmitter for generating trigger signals, indicating a state of the neuron circuit, on outgoing links of the circuit, wherein the state is encoded in a time interval defined by the generated trigger signals; and a digital receiver comprising:

a signal detector for detecting trigger signals on incoming links of the circuit, and digital accumulator logic adapted to:

generate, in response to detection of a first trigger signal on a first incoming link, a weighted signal dependent on (i) a first time interval defined by the first trigger signal and (ii) a weight associated with the first incoming link, the weighted signal being generated based on a first thermometer encoded output value;

accumulate a set of weighted signals generated from detected trigger signals on the incoming links; and determine the state of the neuron circuit based on the accumulated weighted signals, wherein the digital accumulator logic includes counter logic adapted to generate, for each incoming link, a corresponding thermometer-encoded output value, the corresponding thermometer-encoded output value being dependent on a time interval defined by a detected trigger signal on a corresponding incoming link.

2. The circuit of claim 1, wherein the neuron circuit comprises:

the transmitter is operable, for each outgoing link, to encode the weight associated with that link in a pulse signal embedded in trigger signals generated on that link; and the receiver is operable to decode the pulse signal embedded in a trigger signal on an incoming link to obtain the weight associated with that link.

3. The circuit of claim 1, wherein the neuron circuit comprises:

the digital accumulator logic is adapted to accumulate said weighted signals periodically, with period T, to determine said state of the neuron circuit at an end of each period T; and the digital transmitter is adapted to generate a trigger signal indicating that state during a next period T.

4. The circuit of claim 3, wherein the digital transmitter is adapted such that the trigger signal defines said time interval with reference to the end of said next period T.

5. The circuit of claim 3, wherein the digital transmitter is adapted such that the trigger signal defines said time interval with reference to a start of said next period T.

6. The circuit of claim 3, wherein the trigger signals comprise one of spike signals and pulse-width modulated signals.

7. The circuit of claim 3, wherein said digital accumulator logic further comprises:

graphical multiplication logic adapted, for each incoming link, to multiply said thermometer-encoded output value by the weight associated with that link to obtain components of said weighted signal; and summation logic adapted to sum said components to generate the weighted signal for each incoming link, and to sum the weighted signals generated during each period T to produce an accumulated signal indicating the neuron state.

8. The circuit of claim 7, wherein the graphical multiplication logic comprises a plurality of lookup tables storing values of said components for possible values of said thermometer-encoded output value.

9. The circuit of claim 7, wherein the summation logic comprises a carry-save adder for summing said components to generate the weighted signal for each incoming link, and a ripple-carry adder for summing the weighted signals to produce said accumulated signal.

10. The circuit of claim 7, wherein the digital accumulator logic is further adapted to apply a non-linear activation function to said accumulated signal to determine the neuron state.

11. The circuit of claim 1, wherein:

the digital accumulator logic is adapted, during each of successive time periods T', to accumulate said weighted signals to produce an accumulated signal and to progressively compare the accumulated signal with a threshold to determine said state of the neuron circuit during that period T'; and the digital transmitter is adapted to generate a trigger signal during that period T' in response to the accumulated signal traversing said threshold.

12. The circuit of claim 11, wherein the trigger signals comprise spike signals.

13. The circuit of claim 11, wherein the digital accumulator logic comprises:

for each incoming link, a digital integrator adapted, in response to detection of a trigger signal on that link, to start integrating a value dependent on the weight associated with that link to generate said weighted signal for that link; and summation logic adapted to sum the weighted signals generated during each period T' to produce said accumulated signal.

14. The circuit of claim 13, wherein the digital integrator comprises concatenated counters, and the summation logic comprises a carry-save adder and a ripple-carry adder.

15. The circuit of claim 11, wherein the digital accumulator logic comprises:

for each incoming link, weighting logic adapted to generate said weighted signal by outputting a weight value, dependent on the weight associated with that link, in response to detection of a trigger signal on that link; and a digital integrator adapted to integrate weight values output by the weighting logic for the incoming links during said time period T' to produce said accumulated signal.

16. The circuit of claim 15, wherein the digital integrator comprises a carry-save adder for summing the weight values output by the weighting logic for the incoming links to produce a sum value, and a ripple-carry adder adapted to progressively accumulate the sum value during the time period T' to produce said accumulated signal.

17. The circuit of claim 11, wherein the digital accumulator logic is adapted to apply a leaky neuron function to said accumulated signal to implement a leaky neuron circuit.

18. The circuit of claim 11, wherein the receiver is adapted to apply a timing offset to trigger signals on incoming links to mitigate propagation delay differences between incoming links.

19. The circuit of claim 1, wherein the digital accumulator logic is adapted, during each of successive time periods T', to accumulate said weighted signals to produce an accumulated signal, and the neuron circuit is selectively operable in first and second modes such that:

in the first mode, the digital accumulator logic is adapted, during each period T', to progressively compare the accumulated signal with a threshold to determine said state of the neuron circuit during that period T', and the transmitter is adapted to generate a trigger signal during that period T' in response to the accumulated signal traversing said threshold; and in the second mode, the digital accumulator logic is adapted to determine said state of the neuron circuit in dependence on the accumulated signal at an end of each period T', and the transmitter is adapted to generate a trigger signal indicating that state during a next period T'.

20. The circuit of claim 19, wherein the digital accumulator logic comprises:

for each incoming link, a digital integrator adapted, in response to detection of a trigger signal on that link, to start integrating a value dependent on the weight associated with that link to generate said weighted signal for that link; and summation logic adapted to sum the weighted signals generated during each period T' to produce said accumulated signal.

21. The circuit of claim 19, wherein the digital accumulator logic comprises:

for each incoming link, weighting logic adapted to generate said weighted signal by outputting a weight value, dependent on the weight associated with that link, in response to detection of a trigger signal on that link; and a digital integrator adapted to integrate weight values output by the weighting logic for the incoming links during said time period T' to produce said accumulated signal.

22. A spiking neural network apparatus comprising:

multiple neuron circuits interconnected by links, wherein each link connecting respective neuron circuits is associated with a respective weight for transmission of signals between the neuron circuits, wherein a neuron circuit of the multiple neuron circuits comprises:

a digital transmitter for generating trigger signals that indicate a state of the neuron circuit, on outgoing links of the circuit, wherein the state is encoded in a time interval defined by the generated trigger signals; and a digital receiver comprising:

a signal detector for detecting trigger signals on incoming links of the circuit, and digital accumulator logic adapted to:

generate, in response to detection of a first trigger signal on a first incoming link, a weighted signal dependent on (i) a first time interval defined by the first trigger signal and (ii) a weight associated with the first incoming link, the weighted signal being generated based on a first thermometer encoded output value;

accumulate a set of weighted signals generated from detected trigger signals on the incoming links; and determine the state of the neuron circuit based on the accumulated weighted signals, wherein the digital accumulator logic includes counter logic adapted to generate, for each incoming link, a corresponding thermometer-encoded output value, the corresponding thermometer-encoded output value being dependent on a time interval defined by a detected trigger signal on a corresponding incoming link.

23. A computer-implemented method comprising:

generating a plurality of trigger signals on a plurality of outgoing links of a neuron circuit of a spiking neural network comprising:

multiple neuron circuits each connected by a plurality of links, wherein the generated trigger signals indicate a state of the neuron circuit that is encoded in a time interval defined by the generated trigger signals;

in response to detecting a first trigger signal of the generated trigger signals on a first incoming link of the neuron circuit, generating a weighted signal for the first incoming link that is dependent on a first time interval defined by the detected trigger signal, wherein a thermometer-encoded output value dependent on the first time interval defined by the first trigger signal is generated for the first incoming link, the weighted signal being generated based on the thermometer-encoded output value; and encoding the weighted signal associated with the first incoming link in a pulse signal embedded in the generated trigger signals on the first incoming link.

24. A computer system comprising:

one or more computer processors;

one or more computer readable storage media; and program instructions stored on the one or more computer readable storage media for execution by at least one of the one or more computer processors, the program instructions comprising:

program instructions to generate a plurality of trigger signals on a plurality of outgoing links of a neuron circuit of a spiking neural network comprising:

multiple neuron circuits each connected by a plurality of links, wherein the generated trigger signals indicate a state of the neuron circuit that is encoded in a time interval defined by the generated trigger signals;

program instructions to, in response to detecting a first trigger signal of the generated trigger signals on a first incoming link of the neuron circuit, generating a weighted signal for the first incoming link that is dependent on a first time interval defined by the detected trigger signal, wherein a thermometer-encoded output value dependent on the first time interval defined by the first trigger signal is generated for the first incoming link, the weighted signal being generated based on the thermometer-encoded output value; and program instructions to encode the weighted signal associated with the first incoming link in a pulse signal embedded in the generated trigger signals on the first incoming link.

* * * * *